(12) United States Patent
Tomioka

(10) Patent No.: US 11,175,486 B2
(45) Date of Patent: Nov. 16, 2021

(54) ZOOM LENS AND IMAGING APPARATUS

(71) Applicant: FUJIFILM Corporation, Tokyo (JP)

(72) Inventor: Ukyo Tomioka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 257 days.

(21) Appl. No.: 16/598,791

(22) Filed: Oct. 10, 2019

(65) Prior Publication Data
US 2020/0116983 A1  Apr. 16, 2020

(30) Foreign Application Priority Data
Oct. 16, 2018  (JP) .............................. JP2018-195202

(51) Int. Cl.
*G02B 15/14* (2006.01)
*G02B 15/20* (2006.01)
*G02B 15/173* (2006.01)

(52) U.S. Cl.
CPC ....... *G02B 15/1461* (2019.08); *G02B 15/173* (2013.01); *G02B 15/20* (2013.01)

(58) Field of Classification Search
CPC .. G02B 15/1461; G02B 15/173; G02B 15/20; G02B 15/14
USPC .................................................. 359/676, 684
See application file for complete search history.

(56) References Cited

U.S. PATENT DOCUMENTS

| 5,225,937 A | * | 7/1993 | Horiuchi | G02B 15/17 359/688 |
| 2006/0018035 A1 | * | 1/2006 | Takatsuki | G02B 15/173 359/687 |
| 2013/0208155 A1 | * | 8/2013 | Hatada | G02B 15/17 348/294 |
| 2017/0276915 A1 | * | 9/2017 | Tomioka | H04N 7/183 |

FOREIGN PATENT DOCUMENTS

| JP | 4610959 B2 | 1/2011 |
| JP | 5857306 B2 | 2/2016 |

* cited by examiner

*Primary Examiner* — James R Greece
(74) *Attorney, Agent, or Firm* — Studebaker & Brackett PC

(57) ABSTRACT

The zoom lens consists of, in order from an object side, a positive first lens group, a negative second lens group, a positive third lens group, a stop, and a negative fourth lens group. During zooming, the second and third lens groups move. The fourth lens group consists of, in order from the object side, a fourth A lens group, a negative fourth B lens group moving during image blur correction, a positive fourth C lens group, and a negative fourth D lens group moving during focusing, and a positive fourth E lens group. The zoom lens satisfies predetermined conditional expressions.

17 Claims, 18 Drawing Sheets

EXAMPLE 1

EXAMPLE 1

FIG. 3
EXAMPLE 1
WIDE
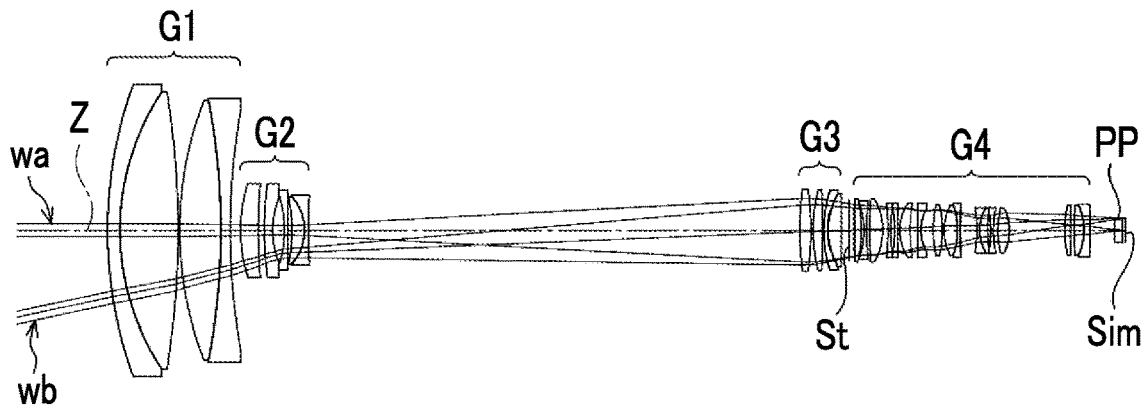
MIDDLE
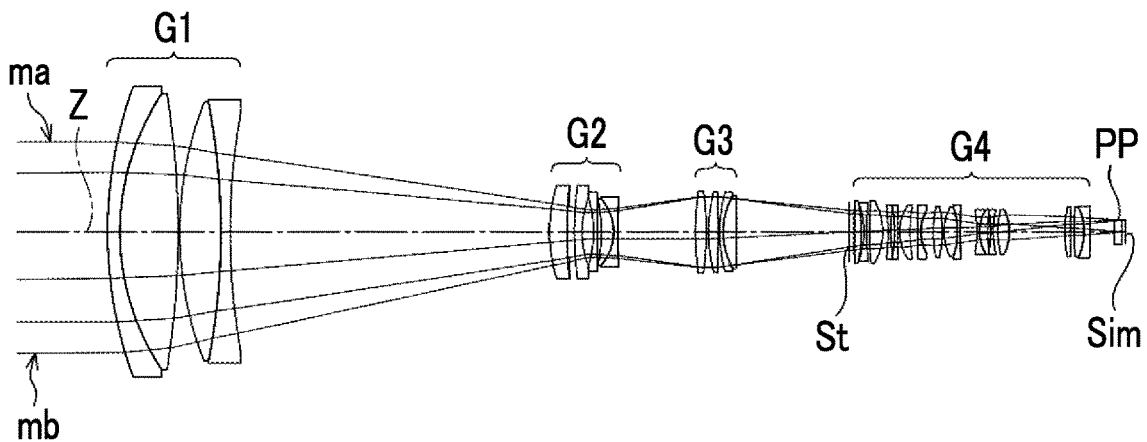
TELE
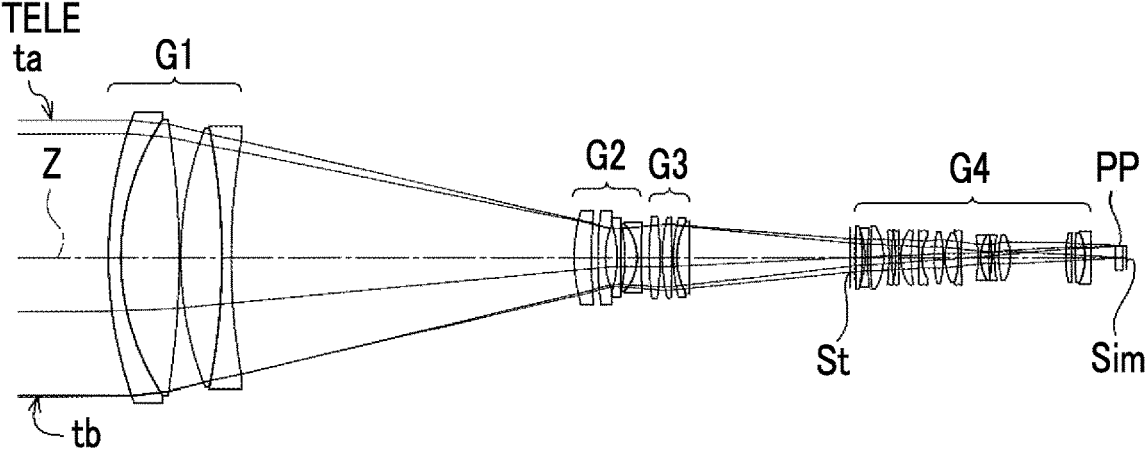

EXAMPLE 2

EXAMPLE 3

EXAMPLE 4

EXAMPLE 5

FIG. 8
EXAMPLE 1
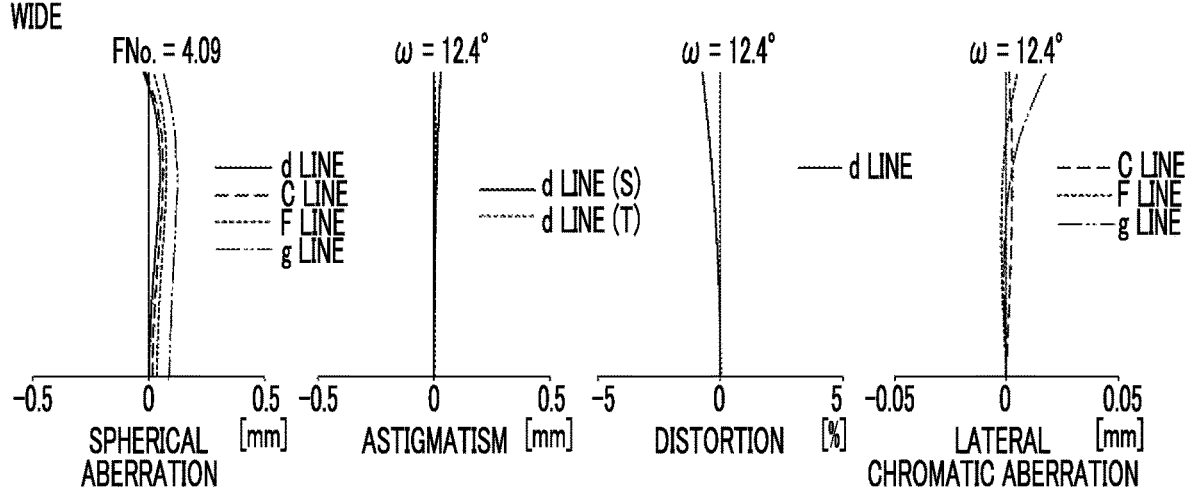
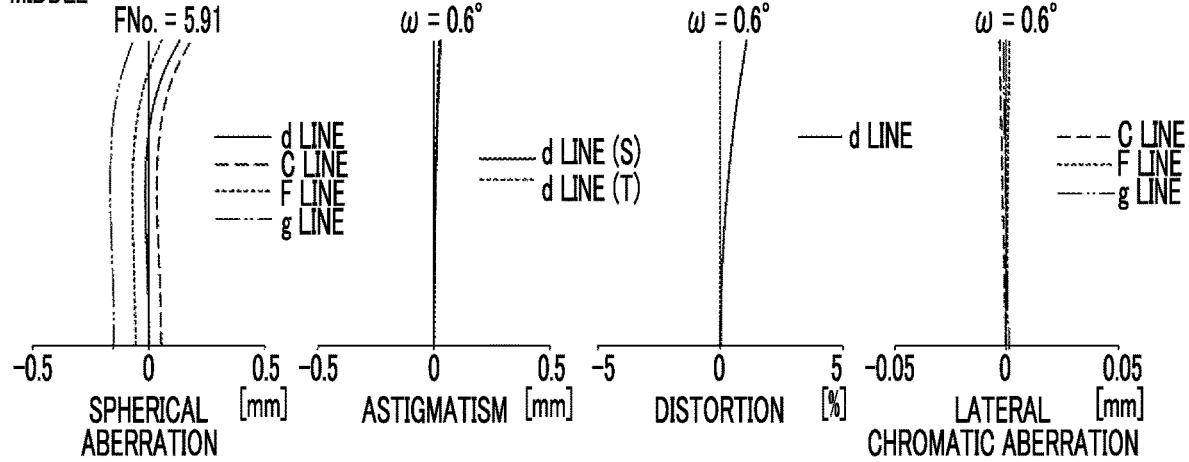
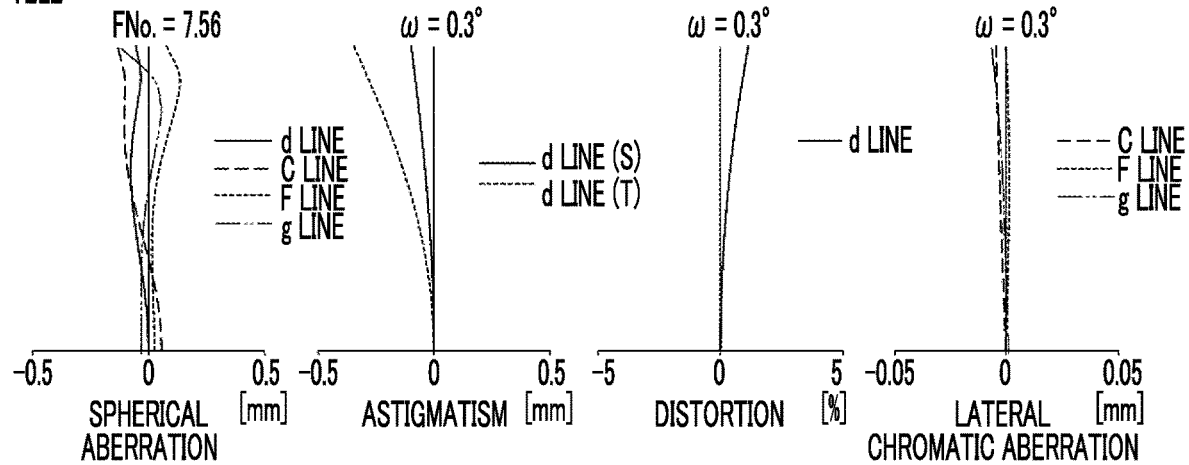

FIG. 9
EXAMPLE 1
NO OPTICAL SYSTEM TILT
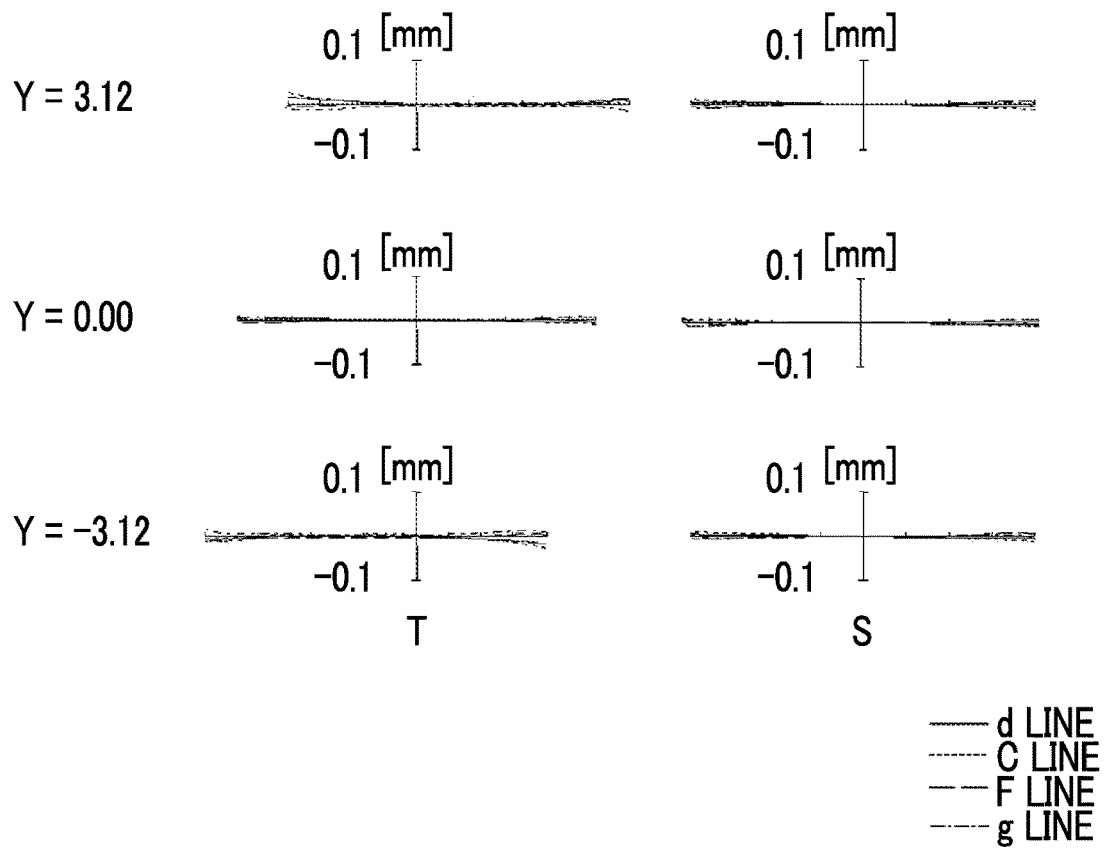
OPTICAL SYSTEM TILT 0.2° CORRECTION
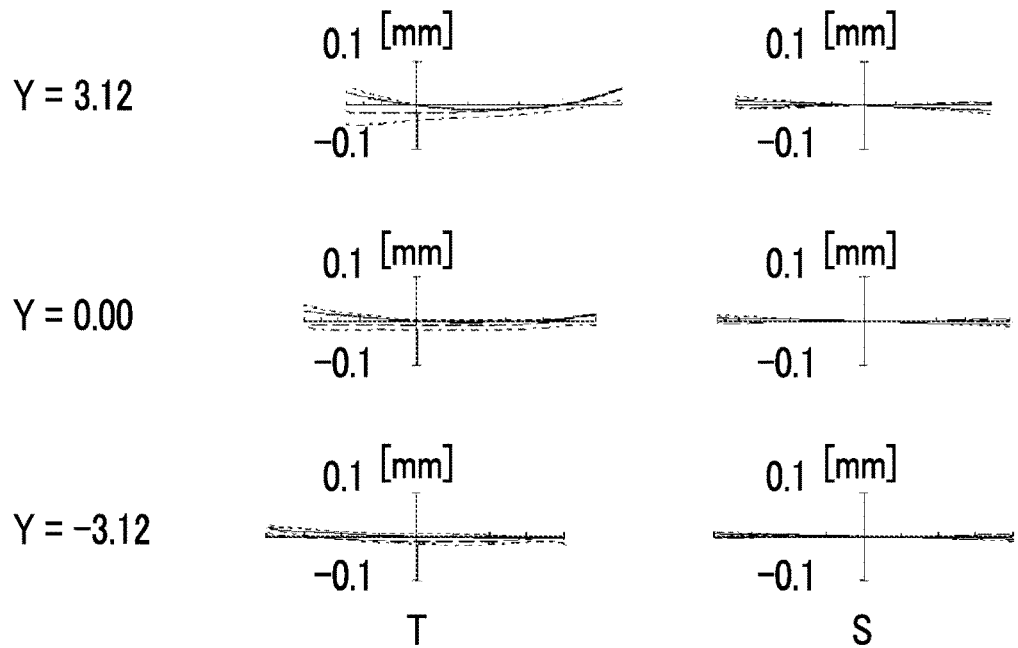

EXAMPLE 2

FIG. 11
EXAMPLE 2
NO OPTICAL SYSTEM TILT
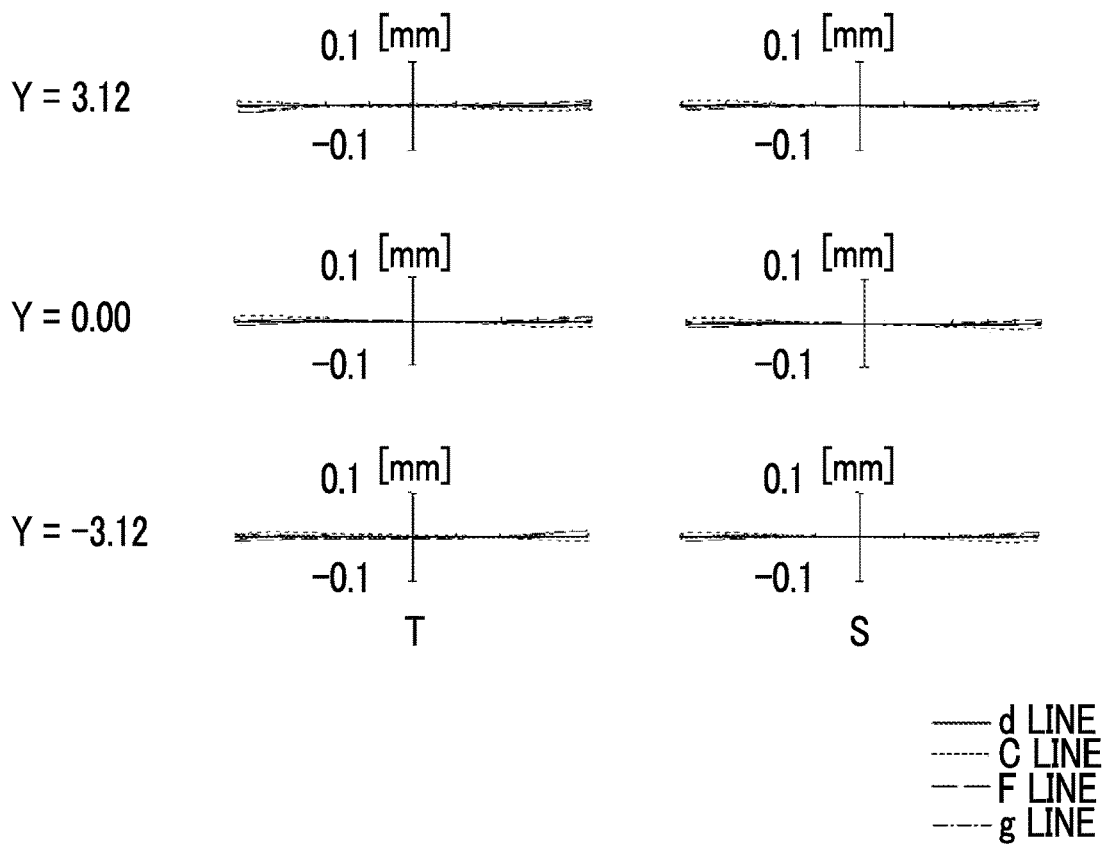
OPTICAL SYSTEM TILT 0.2° CORRECTION
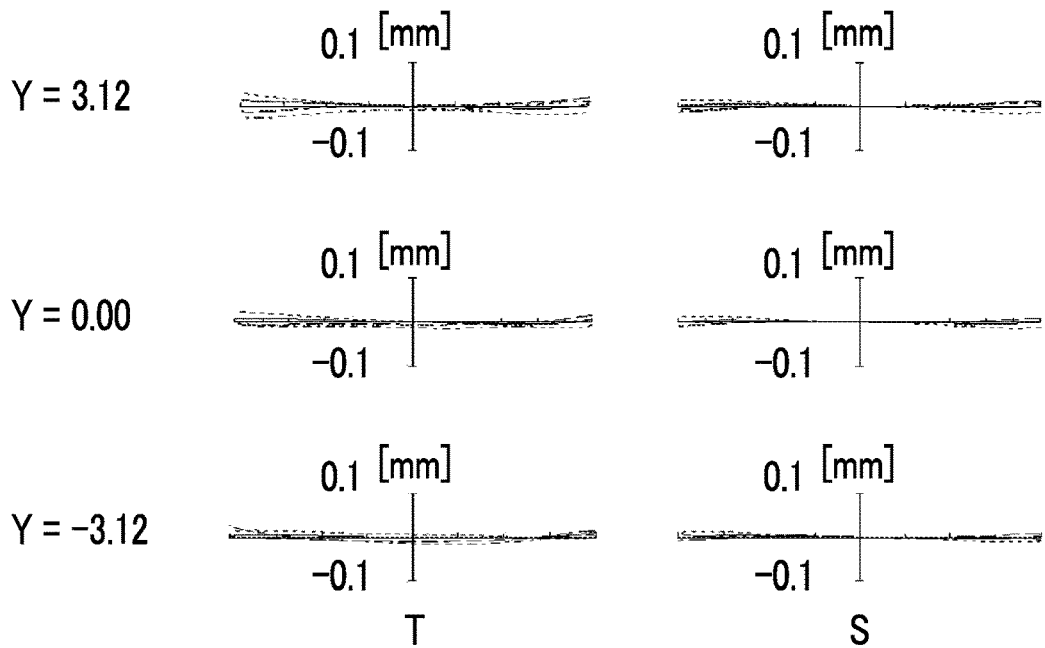

EXAMPLE 3

FIG. 13
EXAMPLE 3
NO OPTICAL SYSTEM TILT
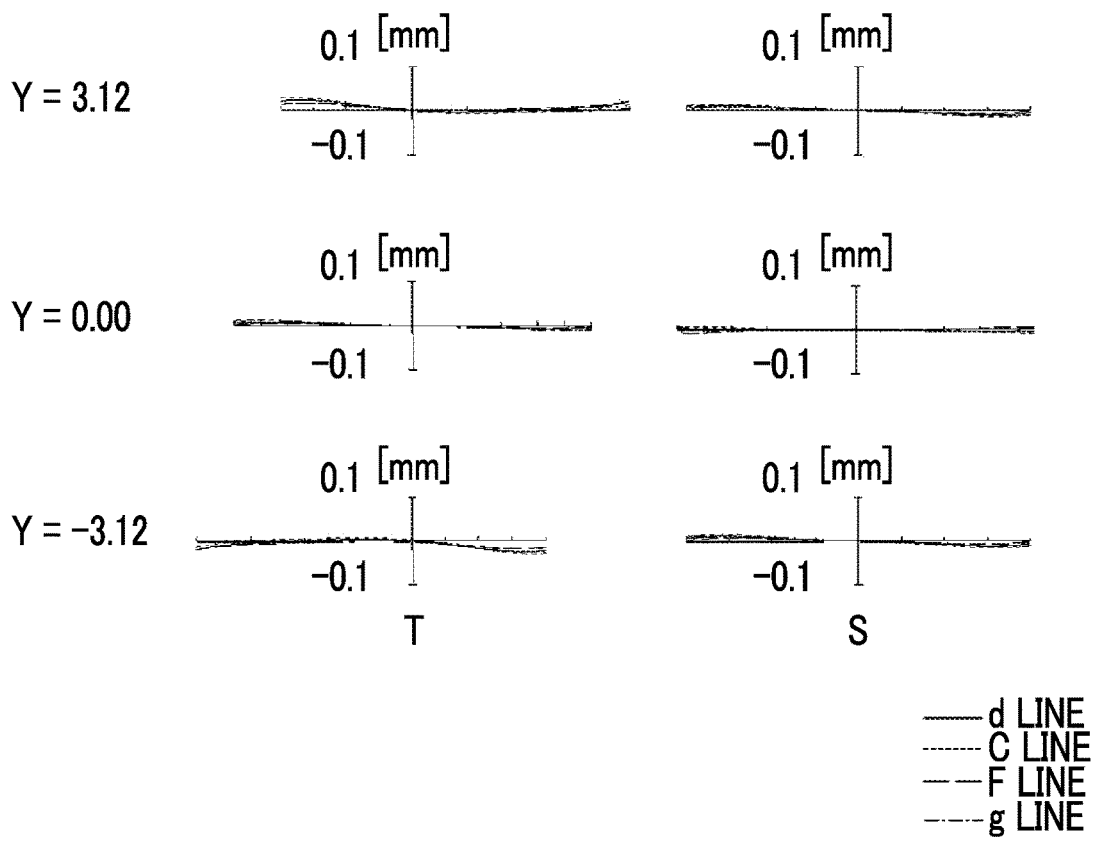
OPTICAL SYSTEM TILT 0.2° CORRECTION
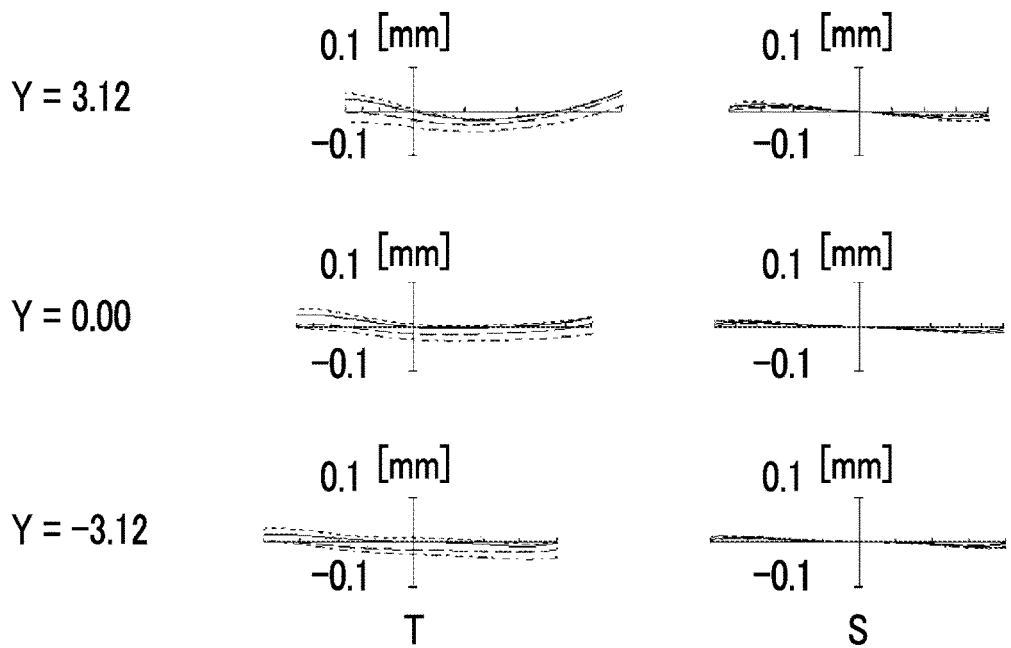

EXAMPLE 4

FIG. 15
EXAMPLE 4
NO OPTICAL SYSTEM TILT
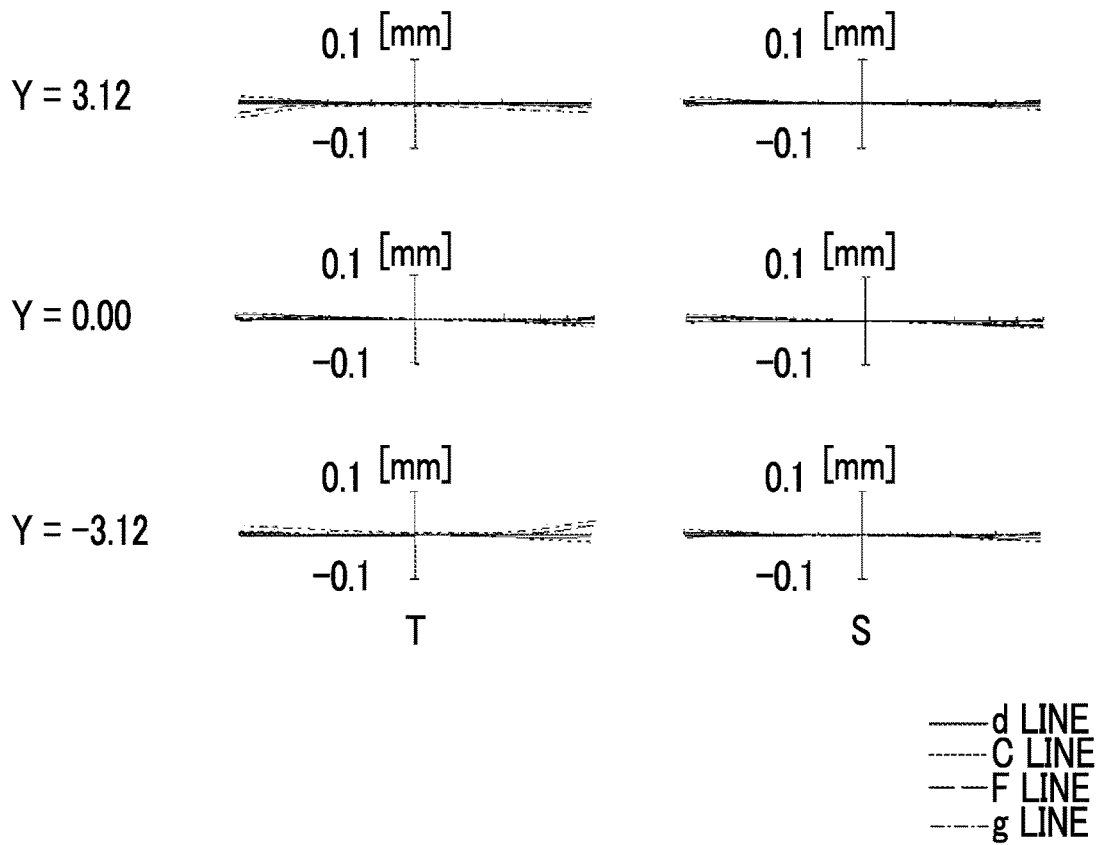
OPTICAL SYSTEM TILT 0.2° CORRECTION
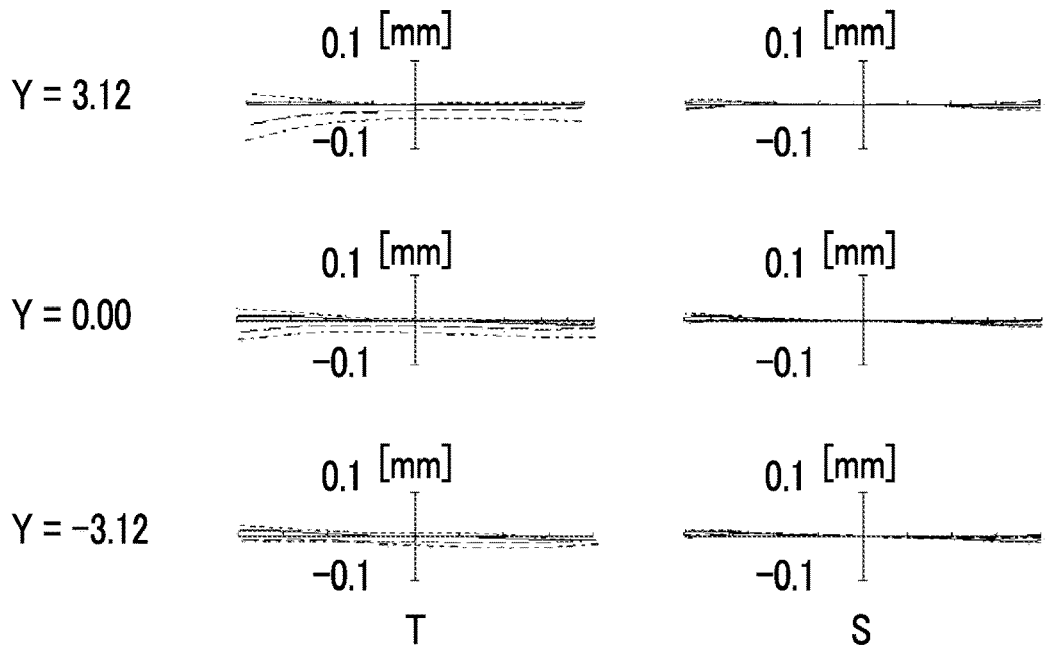

EXAMPLE 5

FIG. 17
EXAMPLE 5
NO OPTICAL SYSTEM TILT
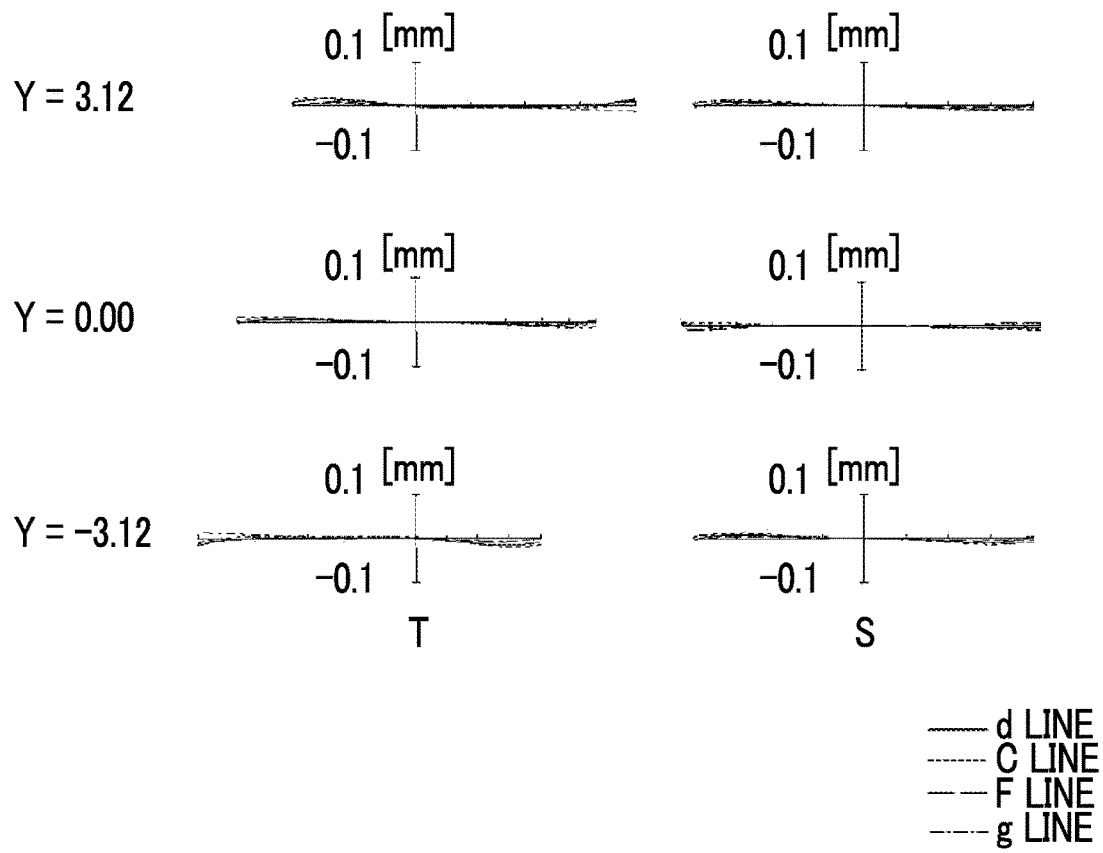
OPTICAL SYSTEM TILT 0.2° CORRECTION
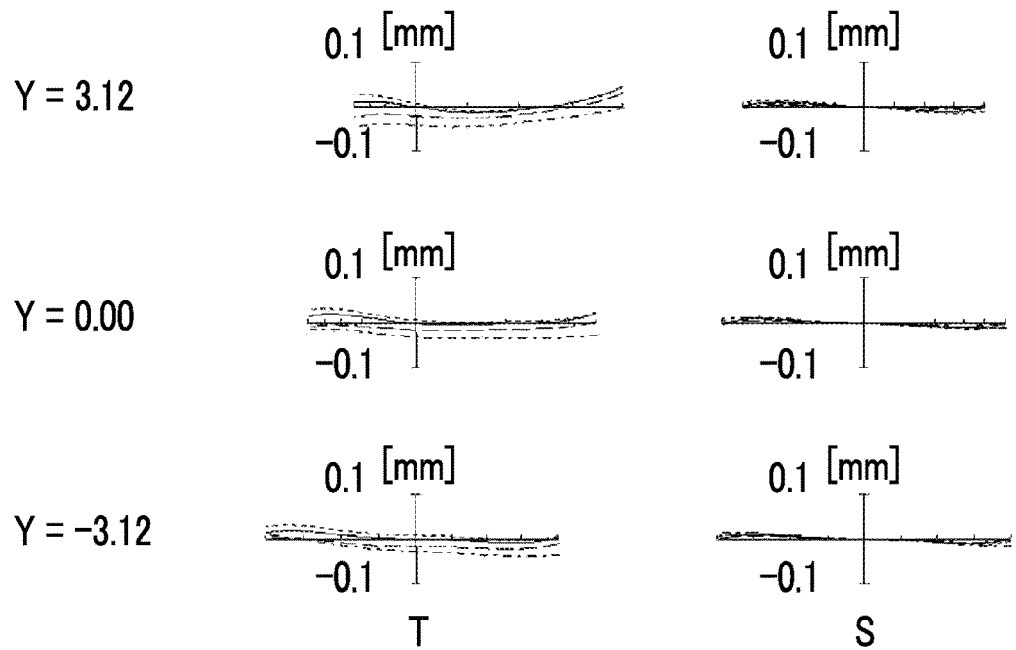

ZOOM LENS AND IMAGING APPARATUS

CROSS-REFERENCE TO RELATED APPLICATIONS

The present application claims priority under 35 U.S.C. § 119 to Japanese Patent Application No. 2018-195202, filed on Oct. 16, 2018. The above application is hereby expressly incorporated by reference, in its entirety, into the present application.

BACKGROUND OF THE INVENTION

1. Field of the Invention

The present disclosure relates to a zoom lens and an imaging apparatus.

2. Description of the Related Art

In the related art, various telephoto type zoom lenses have been proposed. For example, JP4610959B describes a zoom lens consisting of, in order from an object side: a first lens group that has a positive refractive power; a second lens group that has a negative refractive power; a third lens group that has a positive refractive power; and a fourth lens group that has a negative refractive power. With such a configuration, the zoom lens is applicable to surveillance video cameras. Further, JP5857306B describes a zoom lens consisting of, in order from an object side: a first lens group that has a positive refractive power; a second lens group that has a negative refractive power; a third lens group that has a positive refractive power; and a fourth lens group that has a positive refractive power. With such a configuration, the zoom lens is applicable to single-lens reflex cameras.

SUMMARY OF THE INVENTION

As one of the applications of a telephoto type zoom lens having a long focal length, there is a remote surveillance camera used in a harbor or the like. In remote surveillance cameras, it is an issue to correct image blurring caused by vibration at the installation site and/or weather conditions such as wind. Therefore, it is preferable that the zoom lens mounted on this camera comprises a lens group (hereinafter referred to as a vibration reduction lens group) that moves in a case of correcting image blurring.

On the other hand, the telephoto type zoom lens tends to increase in size, and it is preferable that the zoom lens is configured such that the reduction in size of the whole system is taken into consideration while having a long focal length on the telephoto side. Further, in a zoom lens having a focusing function, it is also preferable to miniaturize a lens group (hereinafter referred to as a focusing lens group) which moves during focusing in order to achieve an increase in speed of autofocus.

The zoom lens described in JP4610959B is a telephoto type lens system in which a half angle of view at the telephoto end is 0.3°, but JP4610959B does not describe a vibration reduction lens group. The zoom lens described in JP5857306B has arrangement of positive, negative positive, and positive refractive powers in order from the object side, where the fourth lens group has a positive refractive power. Thus, there is a problem in that the total optical length becomes long in a case where the focal length becomes long. Further, the zoom lens described in JP5857306B performs focusing by using the lens of the first lens group having a large lens diameter. Thus, the zoom lens has a disadvantage in that the focusing lens group becomes large in diameter and autofocusing is performed quickly.

The present disclosure has been made in view of the above circumstances. According to embodiments of the present invention, in order to solve the above problems, it is desirable to a zoom lens that is capable of reducing the total optical length while achieving an increase in focal length on the telephoto side and that comprises a vibration reduction lens group and a focusing lens group having a small diameter so as to have favorable optical performance. In addition, it is possible to provide an imaging apparatus comprising the zoom lens.

The specific means for achieving the object includes the following aspects. A zoom lens according to a first aspect of the present disclosure consists of, in order from an object side to an image side: a first lens group that has a positive refractive power; a second lens group that has a negative refractive power; a third lens group that has a positive refractive power; a stop; and a fourth lens group that has a negative refractive power. The fourth lens group consists of, in order from the object side to the image side, a fourth A lens group, a fourth B lens group which has a negative refractive power and which moves in a direction intersecting with an optical axis during image blur correction, a fourth C lens group which has a positive refractive power, a fourth D lens group which has a negative refractive power and which moves along the optical axis during focusing, and a fourth E lens group which has a positive refractive power. During zooming from a wide-angle end to a telephoto end, the second lens group moves to the image side, the third lens group moves to the object side, and the first lens group, the stop, the fourth A lens group, the fourth B lens group, the fourth C lens group, and the fourth E lens group remain stationary with respect to an image plane. During image blur correction, the fourth A lens group and the fourth C lens group remain stationary with respect to the image plane. During focusing, the lens groups other than the fourth D lens group remain stationary with respect to the image plane. It is assumed that a composite focal length of the fourth A lens group, the fourth B lens group, and the fourth C lens group is f4abc, and a focal length of the fourth D lens group is f4d. Conditional Expression (1) is satisfied, which is represented by $-5 < f4abc/f4d < 0$ (1).

In the zoom lens of the present aspect, it is preferable to satisfy Conditional Expression (1-1).

$$-2.8 < f4abc/f4d < -1 \quad (1\text{-}1)$$

In the zoom lens of the above aspect, it is preferable that the first lens group has a cemented lens formed by cementing a biconvex lens and a biconcave lens, in order from the object side, at a position closest to the image side.

In the zoom lens of the above aspect, it is preferable that a lens closest to the image side in the first lens group is a biconcave lens. In addition, assuming that a distance on the optical axis from a lens surface closest to the object side in the first lens group to the lens surface closest to the image side in the first lens group is G1D, a distance on the optical axis from a reference to an image side principal point of the first lens group in a case where the lens surface closest to the image side in the first lens group is set as the reference is G1Pr, and regarding G1Pr, a sign of the distance on the object side from the reference is negative and a sign of the distance on the image side from the reference is positive, it is preferable to satisfy Conditional Expression (2), and it is more preferable to satisfy Conditional Expression (2-1).

$$-1.5 < G1Pr/G1D < 0 \quad (2)$$

$$-1 < G1Pr/G1D < -0.5 \quad (2\text{-}1)$$

In the zoom lens of the above aspect, it is preferable that the first lens group consists of, in order from the object side to the image side, a first lens as a meniscus lens of which an image side surface is concave and which has a negative refractive power, a second lens as a biconvex lens, a third lens as a biconvex lens, and a fourth lens as a biconcave lens. It is preferable that the third lens and the fourth lens are cemented with each other. In addition, assuming that a partial dispersion ratio of the first lens between a g line and an F line is θgF11, and a partial dispersion ratio of the second lens between the g line and the F line is θgF12, it is preferable to satisfy Conditional Expression (3), and it is more preferable to satisfy Conditional Expression (3-1).

$$-0.08 < \theta gF11 - \theta gF12 < 0.08 \quad (3)$$

$$-0.04 < \theta gF11 - \theta gF12 < 0.04 \quad (3\text{-}1)$$

In the zoom lens of the above aspect, assuming that a distance on the optical axis from a lens surface closest to the image side in the first lens group to a lens surface closest to the object side in the second lens group at the telephoto end is G12DT, and a focal length of the first lens group is f1, it is preferable to satisfy Conditional Expression (4), and it is more preferable to satisfy Conditional Expression (4-1).

$$0.3 < G12DT/f1 < 1 \quad (4)$$

$$0.45 < G12DT/f1 < 0.7 \quad (4\text{-}1)$$

In the zoom lens of the above aspect, it is preferable that the second lens group consists of, in order from the object side to the image side, a positive lens of which an object side surface is convex, a negative lens of which an image side surface is concave, a negative lens of which an object side surface is concave, and a cemented lens. In addition, it is preferable that the cemented lens of the second lens group is formed by cementing a positive lens and a negative lens in order from the object side, and has a cemented surface concave toward the object side.

In the zoom lens of the above aspect, it is preferable that in a state where an object at infinity is in focus, during zooming from the wide-angle end to the telephoto end, the second lens group and the third lens group simultaneously pass through respective points at which lateral magnifications are −1.

In the zoom lens of the above aspect, assuming that a lateral magnification of the fourth B lens group at the telephoto end in a state where an object at infinity is in focus is βG4B, it is preferable to satisfy Conditional Expression (5), and it is more preferable to satisfy Conditional Expression (5-1).

$$-2 < 1/\beta G4B < 0 \quad (5)$$

$$-0.6 < 1/\beta G4B < -0.1 \quad (5\text{-}1)$$

In the zoom lens of the above aspect, assuming that a lateral magnification of the fourth D lens group at the telephoto end in a state where an object at infinity is in focus is βG4D, it is preferable to satisfy Conditional Expression (6), and it is more preferable to satisfy Conditional Expression (6-1).

$$0.5 < \beta G4D < 6 \quad (6)$$

$$1.5 < \beta G4D < 4 \quad (6\text{-}1)$$

In the zoom lens of the above aspect, it is preferable that the fourth D lens group consists of four lenses.

An imaging apparatus according to a second aspect of the present disclosure comprises the imaging lens of the above-mentioned aspect.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" in the present specification means that the group has a positive refractive power as a whole. Likewise, the "~ group having a negative refractive power" means that the group has a negative refractive power as a whole. The term "a lens having a positive refractive power" and the term "a positive lens" are synonymous. The term "a lens having a negative refractive power" and the term "negative lens" are synonymous. The "lens group" is not limited to a configuration using a plurality of lenses, but may consist of only one lens.

A compound aspheric lens (a lens which is integrally composed of a spherical lens and a film having an aspheric shape formed on the spherical lens, and functions as one aspheric lens as a whole) is not be considered as a cemented lens, and is treated as a single lens. The sign of the refractive power and the surface shape of the lens surface of a lens including an aspheric surface are considered in terms of the paraxial region unless otherwise noted.

The "focal length" used in a conditional expression is a paraxial focal length. The values used in conditional expressions other than conditional expressions relating to the partial dispersion ratio are values in the case of using the d line as a reference in a state where the object at infinity is in focus. The partial dispersion ratio θgF between the g line and the F line of a certain lens is defined by θgF=(Ng−NF)/(NF−NC), where Ng, NF, and NC are the refractive indices of the lens at the g line, the F line, and the C line. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the above-mentioned embodiment of the present invention, it is possible to provide a zoom lens that is capable of reducing the total optical length while achieving an increase in focal length on the telephoto side and that comprises a vibration reduction lens group and a focusing lens group having a small diameter so as to have favorable optical performance. In addition, it is possible to provide an imaging apparatus comprising the zoom lens.

BRIEF DESCRIPTION OF THE DRAWINGS

FIG. 3 is a cross-sectional view showing configurations and rays of the zoom lens shown in FIG. 1 in each zoom state.

FIG. 8 shows spherical aberration diagrams, astigmatism diagrams, distortion diagrams, lateral chromatic aberration diagrams of the zoom lens of Example 1 of the present invention.

FIG. 9 is a lateral aberration diagram at the telephoto end of the zoom lens according to Example 1 of the present invention in a case where the optical system is not tilted and in a case where the optical system is tilted and image blurring is corrected.

FIG. 11 is a lateral aberration diagram at the telephoto end of the zoom lens according to Example 2 of the present invention in a case where the optical system is not tilted and in a case where the optical system is tilted and image blurring is corrected.

FIG. 13 is a lateral aberration diagram at the telephoto end of the zoom lens according to Example 3 of the present invention in a case where the optical system is not tilted and in a case where the optical system is tilted and image blurring is corrected.

FIG. 15 is a lateral aberration diagram at the telephoto end of the zoom lens according to Example 4 of the present invention in a case where the optical system is not tilted and in a case where the optical system is tilted and image blurring is corrected.

FIG. 17 is a lateral aberration diagram at the telephoto end of the zoom lens according to Example 5 of the present invention in a case where the optical system is not tilted and in a case where the optical system is tilted and image blurring is corrected.

DESCRIPTION OF THE PREFERRED EMBODIMENTS

Figure 1:
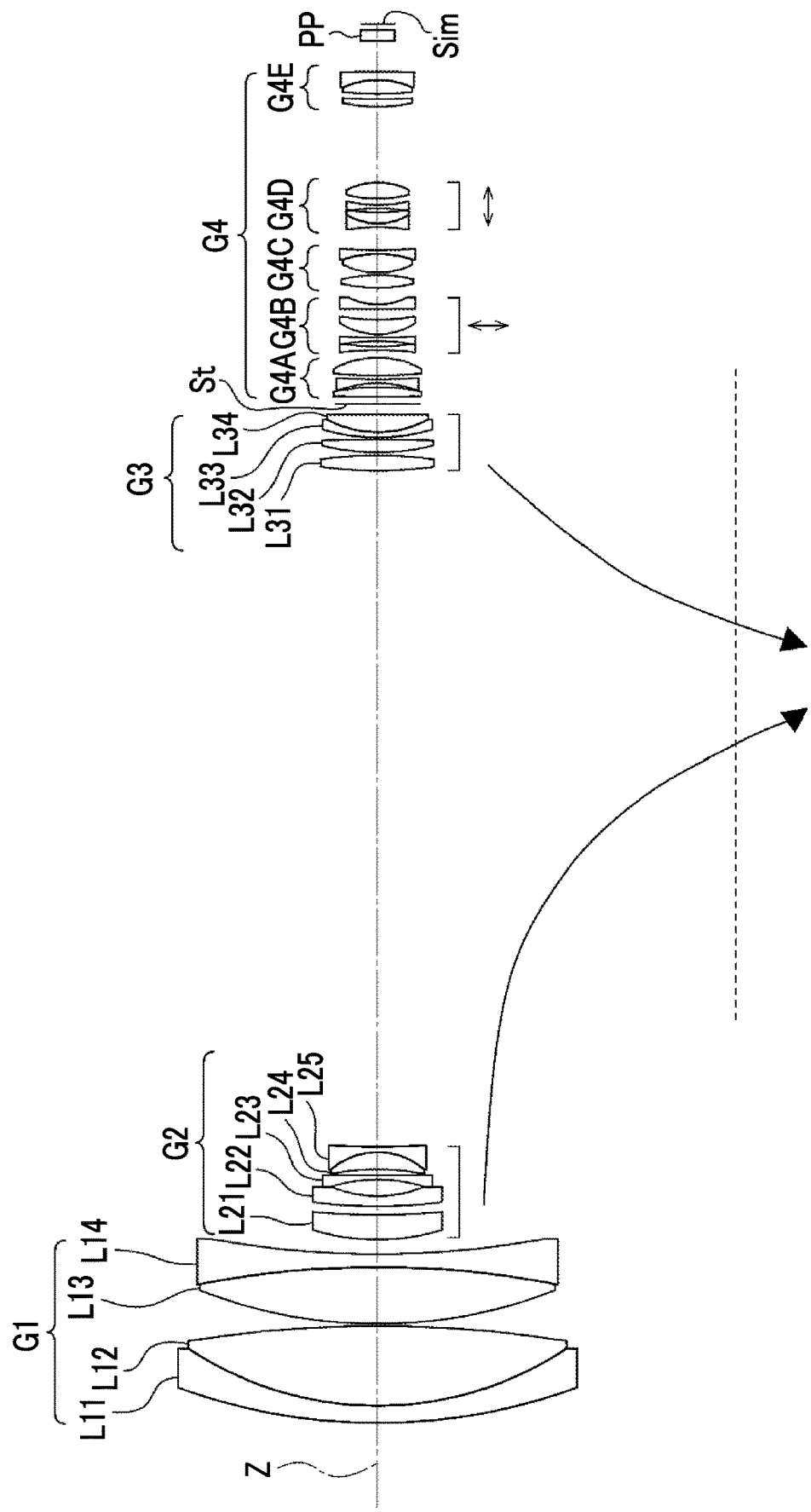
FIG. 1 is a diagram showing a cross-sectional view of a configuration of a zoom lens according to an embodiment of the present invention and a movement locus corresponding to a zoom lens of Example 1 of the present invention.
Figure 2:
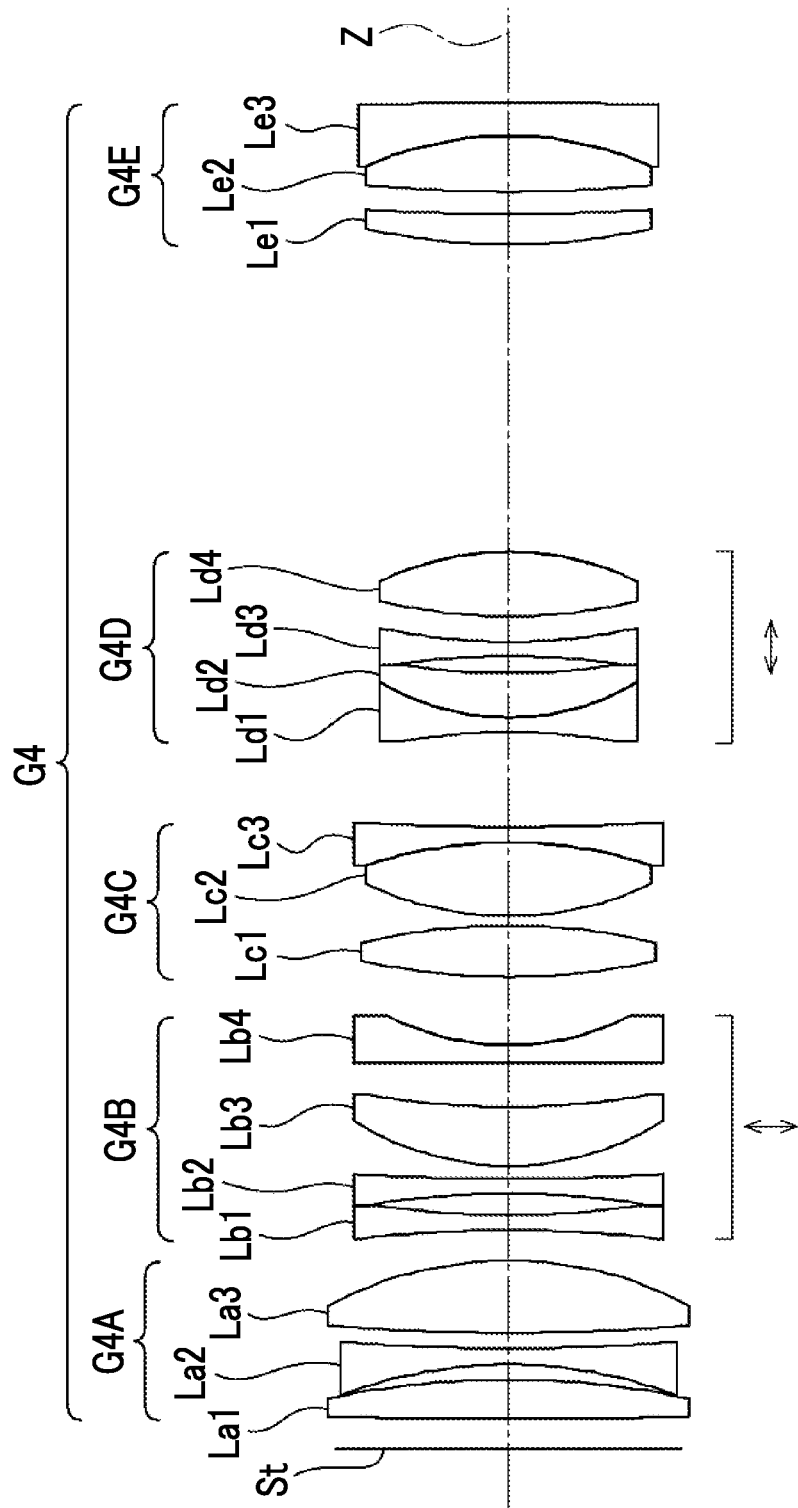
FIG. 2 is a cross-sectional view showing a configuration of a fourth lens group of the zoom lens shown in FIG. 1.

Hereinafter, embodiments of the zoom lens of the present disclosure will be described in detail with reference to the drawings. FIG. 1 shows a cross-sectional view of a configuration and movement loci of a zoom lens at the wide-angle end according to an embodiment of the present invention. FIG. 2 is a partially enlarged view of the zoom lens. FIG. 3 is a cross-sectional view showing the lens configuration and the rays in each zoom state of the zoom lens. The examples shown in FIGS. 1 to 3 correspond to the zoom lens of Example 1 to be described later. FIGS. 1 to 3 show situations where an object at infinity is in focus, the left side thereof is an object side, and the right side thereof is an image side. In FIG. 3, the upper part labeled by "WIDE" shows the wide-angle end state, the middle part labeled by "MIDDLE" shows the middle focal length state, and the lower part labeled by "TELE" shows the telephoto end state. FIG. 3 shows rays including on-axis rays wa and rays with the maximum angle of view wb at the wide-angle end state, on-axis rays ma and rays with the maximum angle of view mb at the middle focal length state, and on-axis rays to and rays with the maximum angle of view tb at the telephoto end state.

FIGS. 1 and 3 show an example in which, assuming that a zoom lens is applied to an imaging apparatus, an optical member PP having a parallel plate shape is disposed between the zoom lens and the image plane Sim. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The zoom lens of the present disclosure consists of, in order from the object side to the image side along the optical axis Z, a first lens group G1 that has a positive refractive power, a second lens group G2 that has a negative refractive power, a third lens group G3 that has a positive refractive power, an aperture stop St, and a fourth lens group G4 that has a negative refractive power. Further, the aperture stop St shown in each of FIGS. 1 to 3 does not show its shape but shows its position in the direction of the optical axis. During zooming from the wide-angle end to the telephoto end, the second lens group G2 constantly moves to the image side, the third lens group G3 constantly moves to the object side, and the first lens group G1 and the aperture stop St remains stationary with respect to the image plane Sim. In FIG. 1, under the second lens group G2 and the third lens group G3, movement loci of the lens groups during zooming from the wide-angle end to the telephoto end are schematically indicated by arrows.

Further, the first lens group G1, which is closest to the object side, is configured to remain stationary during zooming. In such a configuration, the total optical length does not change during zooming, and it is possible to reduce fluctuation in barycenter of the lens system. Thus, it is possible to improve the convenience at the time of imaging. The total optical length is a sum of a back focal length as an air conversion distance and a distance on the optical axis from the lens surface closest to the object side to a lens surface closest to the image side. It is possible to increase the zoom ratio by respectively making the second lens group G2 and the third lens group G3, which are movable during zooming, as a lens group having a negative refractive power and a lens group having a positive refractive power. Generally, increasing the focal length of the lens system tends to increase the total optical length, but it is possible to suppress the increase in total optical length while increasing the focal length by making the fourth lens group G4 as a lens group having a negative refractive power.

In the example shown in FIG. 1, the first lens group G1 consists of four lenses L11 to L14 in order from the object side to the image side, and the second lens group G2 consists of five lenses L21 to L25 in order from the object side to the image side, the third lens group G3 consists of four lenses L31 to L34 in order from the object side to the image side, and the fourth lens group G4 consists of seventeen lenses. However, in the zoom lens of the present disclosure, the number of lenses composing each lens group may be different from that in the example shown in FIG. 1.

Since the zoom lens of the present disclosure has a great advantage in the fourth lens group G4, the fourth lens group G4 will be described first. The fourth lens group G4 consists of, in order from the object side to the image side, a fourth A lens group G4A, a fourth B lens group G4B which has a negative refractive power and which moves in a direction intersecting with an optical axis Z during image blur correction, a fourth C lens group G4C which has a positive refractive power, a fourth D lens group G4D which has a negative refractive power and which moves along the optical axis Z during focusing, and a fourth E lens group G4E which has a positive refractive power. During zooming, the fourth A lens group G4A, the fourth B lens group G4B, the fourth C lens group G4C, and the fourth E lens group G4E remain stationary with respect to the image plane Sim.

FIG. 2 is an enlarged view of the aperture stop St and the fourth lens group G4 of the zoom lens of FIG. 1. As shown in FIG. 2, the fourth A lens group G4A consists of three lenses La1 to La3 in order from the object side to the image side, the fourth B lens group G4B consists of four lenses Lb1 to Lb4 in order from the object side to the image side, the fourth C lens group G4C consists of three lenses Lc1 to Lc3 in order from the object side to the image side, the fourth D lens group G4D consists of four lenses Ld1 to Ld4 in order from the object side to the image side, and the fourth E lens group G4E consists of three lenses Le1 to Le3 in order from the object side to the image side. However, in the zoom lens of the present disclosure, the number of lenses composing each lens group in the fourth lens group G4 may be different from that in the example shown in FIG. 2.

The fourth B lens group G4B moves in the direction intersecting with the optical axis Z so as to be able to displace the image position in the direction perpendicular to the optical axis Z, whereby image blur correction can be performed. In the zoom lens of the present disclosure, the fourth A lens group G4A and the fourth C lens group G4C, which are lens groups on both sides of the fourth B lens group G4B, remain stationary with respect to the image plane Sim during image blur correction. In the example shown in FIG. 1, the vibration reduction lens group consists of only the fourth B lens group G4B, and the lens groups other than the fourth B lens group G4B remain stationary with respect to the image plane Sim during image blur correction. The vertical double-headed arrow noted below the fourth B lens group G4B in FIG. 1 indicates that the fourth B lens group G4B is a vibration reduction lens group.

The fourth D lens group G4D moves along the optical axis Z so as to perform focusing. In the zoom lens of the present disclosure, the focusing lens group consists of only the fourth D lens group G4D, and the lens groups other than the fourth D lens group G4D remain stationary with respect to the image plane Sim during focusing. Therefore, in the zoom lens of the present disclosure, the lens of the first lens group G1 whose lens diameter tends to be large is not used for focusing, and thus there is an advantage in achieving an increase in speed of autofocus. The horizontal double-headed arrow noted below the fourth D lens group G4D in FIG. 1 indicates that the fourth D lens group G4D is a focusing lens group.

On the object side of the fourth B lens group G4B, the fourth A lens group G4A remaining stationary during zooming, focusing, and image blur correction is disposed. According to this configuration, it is possible to correct the incident angle of rays incident on the fourth B lens group G4B, and to suppress performance deterioration in a case where the fourth B lens group G4B is moved.

By forming the fourth B lens group G4B as a lens group having a negative refractive power, it is possible to increase the refractive power of the fourth B lens group G4B. Thus, there is an advantage in obtaining a large vibration reduction angle even in a case where the amount of movement of the fourth B lens group G4B is reduced during image blur correction. Here, the vibration reduction angle is an image blur correction angle capable of correcting image blurring by moving the vibration reduction lens group. Further, by making the refractive power of the fourth B lens group G4B negative, even in a case where the refractive power of the fourth B lens group G4B is increased in order to obtain a large vibration reduction angle by moving the fourth B lens group G4B by a small amount, it is possible to suppress an increase in the diameter of the rays passing through the fourth B lens group G4B. As a result, it is possible to achieve reduction in diameter of the fourth B lens group G4B. If the refractive power of the fourth B lens group G4B is made positive, it is necessary to increase the ray diameter in advance in consideration of the effect of converging the rays, and it is necessary to ensure the height from the optical axis Z of the off-axis rays to achieve the image size. As a result, it is difficult to reduce the diameter of the fourth B lens group G4B.

The fourth B lens group G4B can be configured to consist of, for example, three negative lenses and one positive lens. The fourth B lens group G4B may be configured to consist of, in order from the object side to the image side, two negative lenses, a positive lens, and a negative lens, or may be configured to consist of, in order from the object side to the image side, a negative lens, a positive lens, and two negative lenses.

On the image side of the fourth B lens group G4B, a fourth C lens group G4C, which has a positive refractive power and which remains stationary during zooming, focusing, and image blurring correction, is disposed. According to this configuration, the divergent rays emitted from the fourth B lens group G4B can be converged through the fourth C lens group G4C. Thus, it is possible to suppress an increase in diameter of the rays incident on the fourth D lens group G4D.

By forming the fourth D lens group G4D as a lens group having a negative refractive power, it is possible to increase the refractive power of the fourth D lens group G4D. Thus, there is an advantage in increasing the amount of change in image position even in a case where the amount of movement of the fourth D lens group G4D is reduced during focusing. Further, by making the refractive power of the fourth D lens group G4D negative, the refractive power of the fourth D lens group G4D may be increased in order to reduce the amount of movement of the fourth D lens group G4D during focusing. Even in this case, it is possible to suppress an increase in diameter of rays passing through the fourth D lens group G4D. Thereby, it is possible to reduce the diameter of the fourth D lens group G4D, and there is an advantage in achieving an increase in speed of autofocus. If the refractive power of the fourth D lens group G4D is made positive, it is necessary to increase the ray diameter in advance in consideration of the effect of converging the rays, and it is necessary to ensure the height from the optical axis Z of the off-axis rays to achieve the image size. As a result, it is difficult to reduce the diameter of the fourth D lens group G4D.

The fourth D lens group G4D may be configured to consist of four lenses. In such a case, there is an advantage in achieving both reduction in size of the focusing lens group and suppression of aberration fluctuation during focusing. The fourth D lens group G4D may be configured to consist of, for example, two negative lenses and two positive lenses. In such a case, it becomes easy to suppress aberration fluctuation during focusing. Specifically, the fourth D lens group G4D may be configured to consist of, in order from the object side to the image side, a negative lens, a positive lens, a negative lens, and a positive lens. More specifically, the fourth D lens group G4D may be configured to consist of, in order from the object side to the image side, a cemented lens in which a negative lens of which an image side surface is concave and a positive meniscus lens are cemented in order from the object side, a biconcave lens, and a biconvex lens. In a case where the fourth D lens group G4D includes a cemented lens consisting of a negative lens and a positive lens, it becomes easy to suppress fluctuation in the chromatic aberration during focusing.

The fourth E lens group G4E having a positive refractive power is disposed on the image side of the fourth D lens group G4D. According to this configuration, it is possible to give a converging effect to the rays bounced through the fourth D lens group G4D. Therefore, it is possible to suppress an increase in incident angle of the principal rays of the off-axis rays on the image plane Sim.

Assuming that the composite focal length of the fourth A lens group G4A, the fourth B lens group G4B, and the fourth C lens group G4C is f4abc and the focal length of the fourth D lens group G4D is f4d, this zoom lens is configured to satisfy Conditional Expression (1). By not allowing the result of Conditional Expression (1) to be equal to or less than the lower limit, the refractive power of the fourth D lens group G4D is prevented from becoming excessively strong. As a result, it is possible to satisfactorily correct the image plane Sim tilted toward the negative side (minus side). By not allowing the result of Conditional Expression (1) to be equal to or greater than the upper limit, the refractive power necessary for the fourth D lens group G4D can be maintained. Therefore, the amount of movement of the fourth D lens group G4D necessary for focusing can be maintained. As a result, this configuration contributes to reduction in size. In addition, in a case of a configuration in which Conditional Expression (1-1) is satisfied, it is possible to obtain more favorable characteristics.

$$-5 < f4abc/f4d < 0 \quad (1)$$

$$-2.8 < f4abc/f4d < -1 \quad (1-1)$$

Assuming that the lateral magnification of the fourth B lens group G4B at the telephoto end in a state where an object at infinity is in focus is βG4B, it is preferable to satisfy Conditional Expression (5). By not allowing the result of Conditional Expression (5) to be equal to or less than the lower limit, the amount of movement of the fourth B lens group G4B necessary for image blur correction is prevented from becoming excessively large. Thus, it becomes easy to satisfactorily maintain the peripheral light amount in a case where the fourth B lens group G4B is moved for image blur correction. As the value of βG4B in Conditional Expression (5) increases, that is, as 1/βG4B becomes closer to 0, the rays emitted from the fourth B lens group G4B becomes closer to parallel light. In a case where the negative refractive power of the fourth B lens group G4B is constant, as the rays emitted from the fourth B lens group G4B becomes closer to parallel light, the angle of the incident rays to the fourth B lens group G4B becomes larger. Accordingly, by not allowing the result of Conditional Expression (5) to be equal to or greater than the upper limit, the angle of the incident rays to the fourth B lens group G4B is prevented from becoming excessively large. It is possible to suppress fluctuation in coma aberration in a case where the fourth B lens group G4B is moved for image blurring correction. In addition, in a case of a configuration in which Conditional Expression (5-1) is satisfied, it is possible to obtain more favorable characteristics.

$$-2 < 1/\beta G4B < 0 \quad (5)$$

$$-0.6 < 1/\beta G4B < -0.1 \quad (5-1)$$

Assuming that the lateral magnification of the fourth D lens group G4D at the telephoto end in a state where an object at infinity is in focus is βG4D, it is preferable to satisfy Conditional Expression (6). By not allowing the result of Conditional Expression (6) to be equal to or less than the lower limit, the refractive power necessary for the fourth D lens group G4D can be maintained. Therefore, the amount of movement of the fourth D lens group G4D necessary for focusing can be maintained. As a result, this configuration contributes to reduction in size. By not allowing the result of Conditional Expression (6) to be equal to or greater than the upper limit, the refractive power of the fourth D lens group G4D is prevented from becoming excessively strong. As a result, it is possible to satisfactorily correct the image plane Sim tilted toward the negative side (minus side). In addition, in a case of a configuration in which Conditional Expression (6-1) is satisfied, it is possible to obtain more favorable characteristics.

$$0.5 < \beta G4D < 6 \quad (6)$$

$$1.5 < \beta G4D < 4 \quad (6-1)$$

Next, preferred configurations and possible configurations of the first lens group G1, the second lens group G2, and the third lens group G3 will be described. It is preferable that the first lens group G1 has a cemented lens formed by cementing a biconvex lens and a biconcave lens in order from the object side at a position closest to the image side. Since the first lens group G1 has a cemented lens, there is an advantage in correcting chromatic aberration. By using the cemented lens of the above configuration, the cemented surface is convex toward the image side. Therefore, it is possible to increase the incident angle of the rays which are incident on the cemented surface even in a case where the absolute value of the radius of curvature of the cemented surface is not reduced, on the telephoto side. As a result, it is possible to satisfactorily correct longitudinal chromatic aberration.

The lens closest to the image side in the first lens group G1 is a biconcave lens. Assuming that the distance on the optical axis from the lens surface closest to the object side in the first lens group G1 to the lens surface closest to the image side in the first lens group G1 is G1D and the distance on the optical axis from a reference to the image side principal point of the first lens group G1 in a case where the lens surface closest to the image side in the first lens group G1 is set as the reference is G1Pr, it is preferable to satisfy Conditional Expression (2). However, regarding G1Pr, the sign of the distance from the reference to a position on the object side is set to be negative, and the sign of the distance from the reference to a position on the image side is set to be positive. By not allowing the result of Conditional Expression (2) to be equal to or less than the lower limit, the refractive power of the biconcave lens closest to the image side in the first lens group G1 is prevented from becoming excessively strong. As a result, it is possible to satisfactorily correct spherical aberration. By not allowing the result of Conditional Expression (2) to be equal to or greater than the upper limit, it is possible to suppress an increase in size of the total lens length as compared with a zoom lens having the same focal length range. It should be noted that the total lens length described herein is a distance on the optical axis from the lens surface closest to the object side in the first lens group G1 to the lens surface closest to the image side of the fourth lens group G4. In addition, in a case of a configuration in which Conditional Expression (2-1) is satisfied, it is possible to obtain more favorable characteristics.

$$-1.5 < G1Pr/G1D < 0 \tag{2}$$

$$-1 < G1Pr/G1D < -0.5 \tag{2-1}$$

The first lens group G1 consists of, in order from the object side to the image side, a first lens as a meniscus lens of which an image side surface is concave and which has a negative refractive power, a second lens as a biconvex lens, a third lens as a biconvex lens, and a fourth lens as a biconcave lens, where it is preferable that the third lens and the fourth lens be cemented to each other. In such a case, the second lens is able to take charge of the positive refractive power necessary for the first lens group G1, and longitudinal chromatic aberration that occurs in accordance with the positive refractive power can be corrected through the first lens. Further, longitudinal chromatic aberration that remains even after correction performed by the combination of the first lens and the second lens, and spherical aberration that is overcorrected can be satisfactorily corrected through the cemented lens consisting of the third lens and the fourth lens. In the example shown in FIG. 1, the lens L11, the lens L12, the lens L13, and the lens L14 correspond to the first lens, the second lens, the third lens, and the fourth lens, respectively.

In a configuration in which the first lens group G1 consists of four lenses of the first lens to the fourth lens, assuming that the partial dispersion ratio of the first lens between the g line and the F line is θgF11 and the partial dispersion ratio between the g line and the F line of the second lens is θgF12, it is preferable to satisfy Conditional Expression (3). By satisfying Conditional Expression (3), it is possible to correct secondary chromatic aberration occurring in the combination of the first lens and the second lens, and it is possible to obtain favorable optical performance. In addition, in a case of a configuration in which Conditional Expression (3-1) is satisfied, it is possible to obtain more favorable characteristics.

$$-0.08 < \theta gF11 - \theta gF12 < 0.08 \tag{3}$$

$$-0.04 < \theta gF11 - \theta gF12 < 0.04 \tag{3-1}$$

Assuming that distance on the optical axis from the lens surface closest to the image side in the first lens group G1 to the lens surface closest to the object side in the second lens group G2 at the telephoto end is G12DT and the focal length of the first lens group G1 is f1, it is preferable to satisfy Conditional Expression (4). By not allowing the result of Conditional Expression (4) to be equal to or less than the lower limit, there is an advantage in increasing the zoom ratio. By not allowing the result of Conditional Expression (4) to be equal to or greater than the upper limit, it becomes easy to ensure the peripheral light amount in a case where the fourth B lens group G4B moves, at the telephoto end. In addition, in a case of a configuration in which Conditional Expression (4-1) is satisfied, it is possible to obtain more favorable characteristics.

$$0.3 < G12DT/f1 < 1 \tag{4}$$

$$0.45 < G12DT/f1 < 0.7 \tag{4-1}$$

It is preferable that the second lens group G2 has, successively in order from the object side to the image side, a positive lens of which the object side surface is convex, a negative lens of which the image side surface is concave, and a negative lens of which the object side surface is concave. By forming the first, second, and third lenses from the object side in the second lens group G2 in accordance with the above-mentioned configuration, it is possible to satisfactorily correct lateral chromatic aberration at the wide-angle end. The second lens group G2 can be configured to consist of the three lenses and a cemented lens disposed on the image side of the three lenses. In that case, it is preferable that the cemented lens of the second lens group G2 is formed by cementing a positive lens and a negative lens in order from the object side and has a cemented surface concave toward the object side. In such a case, it is possible to satisfactorily correct longitudinal chromatic aberration occurring through the three lenses of the second lens group G2 at the telephoto end.

The third lens group G3 may be configured to have two positive lenses successively in order from the position closest to the object side to the image side. In such a case, there is an advantage in correcting spherical aberration. Further, it becomes easy to make the ray diameter on the image side smaller than those of these two positive lenses. Therefore, there is an advantage in achieving reduction in diameter of the vibration reduction lens group and the focusing lens group. The third lens group G3 may be configured to have a cemented surface convex toward the object side, and may be configured to have a cemented lens formed by cementing a negative lens and a positive lens. In such a case, there is an advantage in satisfactorily correcting longitudinal chromatic aberration. For example, the third lens group G3 can be configured to consist of, in order from the object side to the image side, two positive lenses and a cemented lens having a cemented surface convex toward the object side.

In this zoom lens, in a state in which an object at infinity is in focus, during zooming from the wide-angle end to the telephoto end, the second lens group G2 and the third lens group G3 simultaneously pass through respective points at which lateral magnifications are −1. In such a case, the relative distance between the second lens group G2 and the third lens group G3 can constantly be reduced. Thus, zooming can be performed efficiently, and the zoom lens is appropriate for increasing the zoom ratio. In FIG. 1, in a state where an object at infinity is in focus, the position in the movement locus, at which the lateral magnification of each of the second lens group G2 and the third lens group G3 is −1, is indicated by the dashed line in the horizontal direction.

In the example shown in FIG. 1, the optical member PP is disposed between the zoom lens and the image plane Sim. However, in a case where the optical member PP is the infrared cut filter and a filter that cuts a specific wavelength range of visible light, the optical member PP can be disposed at any position in the optical path. For example, the filter may be disposed to be adjacent to the fourth E lens group G4E on the object side or the image side of the fourth E lens group G4E.

The above-mentioned preferred configurations and available configurations may be optional combinations, and it is preferable to selectively adopt the configurations in accordance with required specification. According to the technology of the present disclosure, it is possible to realize a zoom lens that is capable of reducing the total optical length while achieving a long focal length on the telephoto side and that comprises a vibration reduction lens group and a focusing lens group having a small diameter so as to have favorable optical performance Here, the phrase "achieving a long focal length on the telephoto side" means that the focal length at the telephoto end is equal to or greater than 500 mm.

Next, numerical examples of the zoom lens according to an embodiment of the present invention will be described.

Example 1

FIG. 1 shows a configuration and movement loci of a zoom lens of Example 1, and an illustration method and a configuration thereof is as described above. Therefore, repeated description is partially omitted herein. The zoom lens of Example 1 consists of, in order from the object side to the image side, a first lens group G1 that has a positive refractive power, a second lens group G2 that has a negative refractive power, a third lens group G3 that has a positive refractive power, an aperture stop St, and a fourth lens group G4 that has a negative refractive power. The first lens group G1 consists of four lenses L11 to L14 in order from the object side to the image side, and the second lens group G2 consists of five lenses L21 to L25 in order from the object side to the image side, the third lens group G3 consists of four lenses L31 to L34 in order from the object side to the image side. The fourth lens group G4 consists of, in order from the object side to the image side, a fourth A lens group G4A which has a positive refractive power, a fourth B lens group G4B which has a negative refractive power, a fourth C lens group G4C which has a positive refractive power, a fourth D lens group G4D which has a negative refractive power, and a fourth E lens group G4E which has a positive refractive power. During zooming from the wide-angle end to the telephoto end, the second lens group G2 constantly moves to the image side, the third lens group G3 constantly moves to the object side, and the first lens group G1, the aperture stop St, the fourth A lens group G4A, the fourth B lens group G4B, the fourth C lens group G4C, and the fourth E lens group G4E remain stationary with respect to the image plane Sim. The fourth D lens group G4D remains stationary with respect to the image plane Sim during zooming in a state where an object at infinity is in focus, and moves to the image side during zooming from the wide-angle end to the telephoto end in a state where the object at a finite distance is in focus. The vibration reduction lens group consists of only the fourth B lens group G4B. The focusing lens group consists of only the fourth D lens group G4D. The outline of the zoom lens of Example 1 has been described above.

Regarding the zoom lens of Example 1, Tables 1A and 1B show basic lens data thereof, and Table 2 shows specification and variable surface distances thereof. Here, the basic lens data is displayed to be divided into two tables of Table 1A and Table 1B in order to prevent one table from becoming long. Table 1A shows the first lens group G1, the second lens group G2, the third lens group G3, and the aperture stop St, and Table 1B shows the fourth lens group G4 and the optical member PP. In Table 1B, the rightmost column is divided into groups of the fourth A lens group G4A to the fourth E lens group G4E, where G4A to G4E which are signs of the respective groups are shown. Tables 1A, 1B, and 2 show data in a state where an object at infinity is in focus.

In Tables 1A and 1B, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line, the column of vd shows an Abbe number of each constituent element at the d line, and the column of θgF shows a partial dispersion ratio of each constituent element between the g line and the F line.

In Tables 1A and 1B, the sign of the radius of curvature of the surface convex toward the object side is positive and the sign of the radius of curvature of the surface convex toward the image side is negative. In Table 1A, in a place of a surface number of a surface corresponding to the aperture stop St, the surface number and a term of (St) are noted. A value at the bottom place of D in Table 1B indicates a distance between the image plane Sim and the surface closest to the image side in the table. In Tables 1A and 1B, the variable surface distances during zooming are referenced by the reference signs DD[ ], and are written into places of D, where object side surface numbers of distances are noted in [ ].

In Table 2, values of the zoom ratio Zr, the focal length f of the whole system, the back focal length Bf in terms of the air conversion distance, the F number FNo., the maximum total angle of view 2ω, and variable surface distance during zooming are based on the d line. (°) in the place of 2ω indicates that the unit thereof is a degree. In Table 2, values in the wide-angle end state, the middle focal length state, and the telephoto end state are respectively shown in the columns labeled by WIDE, MIDDLE, and TELE.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1A

| | Example 1 | | | | |
|---|---|---|---|---|---|
| Sn | R | D | Nd | vd | θgF |
| 1 | 163.96092 | 4.620 | 1.51680 | 64.20 | 0.53430 |
| 2 | 96.28500 | 21.500 | 1.49700 | 81.61 | 0.53887 |
| 3 | −338.06902 | 0.580 | | | |

TABLE 1A-continued

Example 1

| Sn | R | D | Nd | νd | θgF |
|---|---|---|---|---|---|
| 4 | 137.43775 | 15.320 | 1.49700 | 81.61 | 0.53887 |
| 5 | −260.63000 | 3.500 | 1.74400 | 44.79 | 0.56560 |
| 6 | 260.63000 | DD[6] | | | |
| 7 | 63.10397 | 6.490 | 1.72825 | 28.46 | 0.60772 |
| 8 | 204.26641 | 2.300 | | | |
| 9 | 141.68875 | 2.790 | 1.80000 | 29.84 | 0.60178 |
| 10 | 34.01585 | 4.360 | | | |
| 11 | −44.83001 | 1.300 | 1.71300 | 53.87 | 0.54587 |
| 12 | ∞ | 1.490 | | | |
| 13 | −64.24011 | 4.640 | 1.78470 | 26.29 | 0.61360 |
| 14 | −19.57600 | 1.520 | 1.71300 | 53.87 | 0.54587 |
| 15 | 270.71408 | DD[15] | | | |
| 16 | 118.04239 | 4.050 | 1.49700 | 81.61 | 0.53887 |
| 17 | −118.04239 | 0.840 | | | |
| 18 | 64.74687 | 3.450 | 1.49700 | 81.61 | 0.53887 |
| 19 | −457.11245 | 0.580 | | | |
| 20 | 56.34460 | 1.350 | 1.91082 | 35.25 | 0.58224 |
| 21 | 28.75400 | 4.790 | 1.53775 | 74.70 | 0.53936 |
| 22 | ∞ | DD[22] | | | |
| 23(St) | ∞ | 2.000 | | | |

TABLE 1B

Example 1

| Sn | R | D | Nd | νd | θgF | |
|---|---|---|---|---|---|---|
| 24 | 409.77796 | 2.620 | 1.75520 | 27.51 | 0.61033 | G4A |
| 25 | −58.17484 | 1.020 | | | | |
| 26 | −30.77057 | 1.070 | 1.90366 | 31.31 | 0.59481 | |
| 27 | 154.56063 | 1.030 | | | | |
| 28 | 154.03867 | 4.800 | 1.51823 | 58.90 | 0.54567 | |
| 29 | −25.27500 | 2.040 | | | | |
| 30 | −83.47839 | 0.980 | 1.72916 | 54.67 | 0.54534 | G4B |
| 31 | 59.30480 | 1.440 | | | | |
| 32 | −56.45314 | 0.980 | 1.51823 | 58.90 | 0.54567 | |
| 33 | 179.83407 | 0.860 | | | | |
| 34 | 19.01592 | 3.940 | 1.78470 | 26.29 | 0.61360 | |
| 35 | 55.50841 | 2.920 | | | | |
| 36 | ∞ | 1.170 | 1.60342 | 38.03 | 0.58356 | |
| 37 | 17.31570 | 4.530 | | | | |
| 38 | 43.63107 | 3.410 | 1.64769 | 33.79 | 0.59393 | G4C |
| 39 | −43.63107 | 0.650 | | | | |
| 40 | 22.08306 | 4.910 | 1.51680 | 64.20 | 0.53430 | |
| 41 | −29.68800 | 1.020 | 1.80518 | 25.42 | 0.61616 | |
| 42 | 169.64153 | 6.220 | | | | |
| 43 | −42.89578 | 0.970 | 1.77250 | 49.60 | 0.55212 | G4D |
| 44 | 16.61900 | 2.940 | 1.63980 | 34.47 | 0.59233 | |
| 45 | 44.40263 | 1.130 | | | | |
| 46 | −53.43193 | 0.960 | 1.71300 | 53.87 | 0.54587 | |
| 47 | 40.21628 | 1.700 | | | | |
| 48 | 37.15605 | 4.290 | 1.51742 | 52.43 | 0.55649 | |
| 49 | −19.43486 | 20.440 | | | | |
| 50 | 42.43698 | 2.030 | 1.76182 | 26.52 | 0.61361 | G4E |
| 51 | 165.62751 | 1.480 | | | | |
| 52 | 103.23830 | 3.720 | 1.53775 | 74.70 | 0.53936 | |
| 53 | −23.32200 | 2.200 | 1.90366 | 31.31 | 0.59481 | |
| 54 | −340.09512 | 9.584 | | | | |
| 55 | ∞ | 2.850 | 1.51680 | 64.20 | 0.53430 | |
| 56 | ∞ | 0.484 | | | | |

TABLE 2

Example 1

| | WIDE | MIDDLE | TELE |
|---|---|---|---|
| Zr | 1.0 | 19.8 | 38.4 |
| f | 20.408 | 403.663 | 783.652 |
| Bf | 11.947 | 11.947 | 11.947 |
| FNo. | 4.09 | 5.91 | 7.56 |

TABLE 2-continued

Example 1

| | WIDE | MIDDLE | TELE |
|---|---|---|---|
| 2ω(°) | 24.8 | 1.2 | 0.6 |
| DD[6] | 3.934 | 117.986 | 126.311 |
| DD[15] | 181.616 | 28.877 | 2.912 |
| DD[22] | 2.790 | 41.476 | 59.116 |

FIGS. 8 and 9 each show aberration diagrams in a state where an object at infinity is brought into focus through the zoom lens of Example 1. FIG. 8 shows aberration diagrams in a state where there is no image blurring. In FIG. 8, in order from the left side, spherical aberration, astigmatism, distortion, and lateral chromatic aberration are shown. In FIG. 8, the upper part labeled by "WIDE" shows aberrations in the wide-angle end state, the middle part labeled by "MIDDLE" shows aberrations in the middle focal length state, the lower part labeled by "TELE" shows aberrations in the telephoto end state. In the spherical aberration diagram, aberrations at the d line, the C line, the F line, and the g line are indicated by the solid line, the long dashed line, the short dashed line, and the chain double-dashed line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the chain double-dashed line. In the spherical aberration diagram, FNo. indicates an F number. In the other aberration diagrams, ω indicates a half angle of view.

FIG. 9 shows lateral aberrations at the telephoto end. In FIG. 9, the upper part labeled by "no optical system tilt" shows aberrations in the state where there is no image blurring. The lower part labeled by "optical system tilt 0.2° correction" shows aberrations in a state where image blur correction is performed by moving the vibration reduction lens group by 1.2 mm in a direction perpendicular to the optical axis Z in a case where there is image blurring caused by the optical system tilt of 0.2°. In FIG. 9, the left column labeled by "T" shows aberrations in the tangential direction, and the right column labeled by "S" shows aberrations in the sagittal direction. Y in FIG. 9 means the image height. FIG. 9 shows aberrations at Y=3.12 corresponding to 70% of the maximum image height on the positive side, Y=0 corresponding to the image height of 0, and Y=−3.12 corresponding to 70% of the maximum image height on the negative side. In the lateral aberration diagram, aberrations at the d line, the C line, the F line, and the g line are respectively indicated by the solid line, the short dashed line, the long dashed line, and the chain line.

Symbols, meanings, description methods, and illustration methods of the respective data pieces according to Example 1 are the same as those in the following examples unless otherwise noted. Therefore, in the following description, repeated description will be omitted.

Example 2

Figure 4:
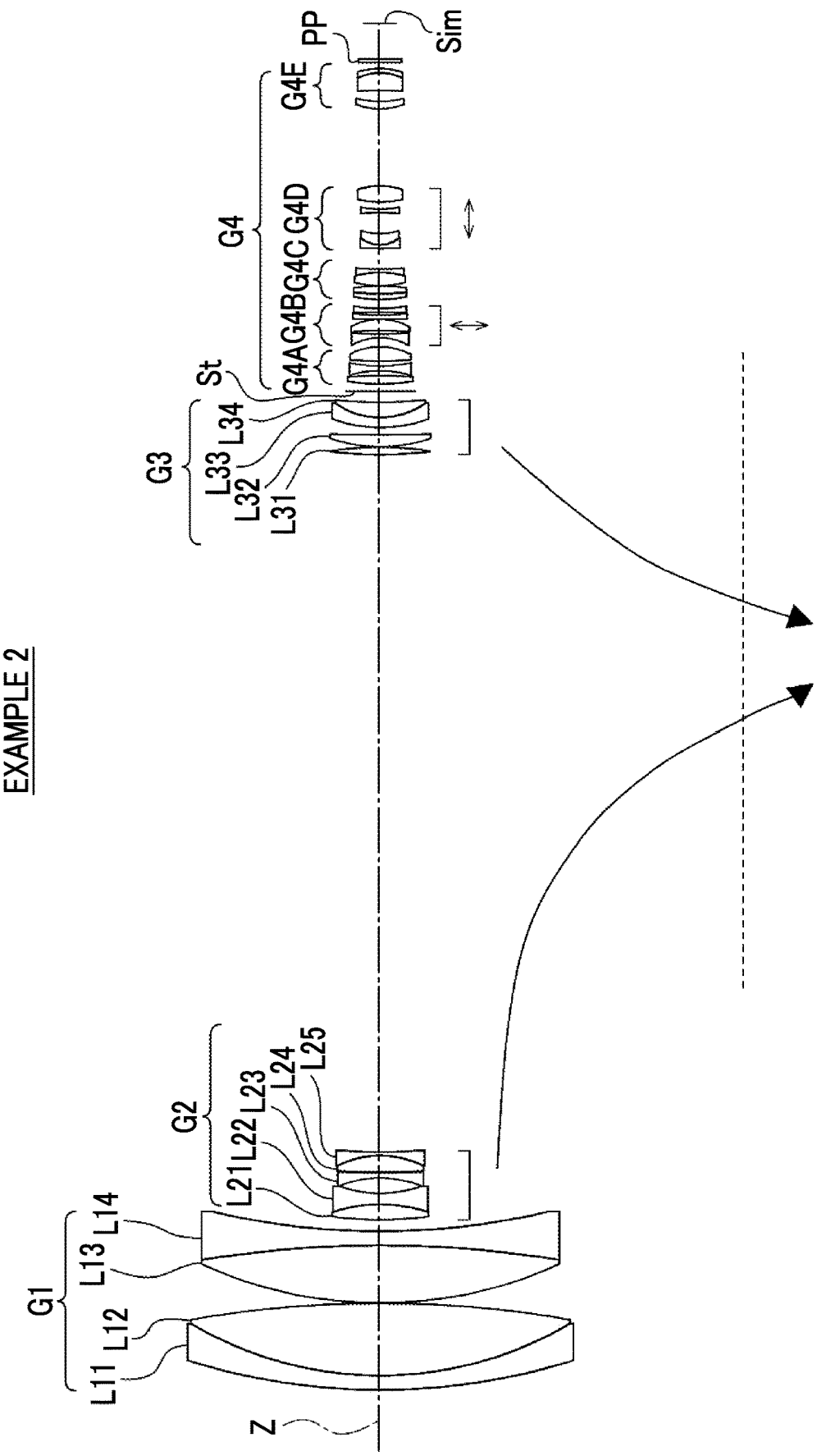
FIG. 4 is a diagram showing a cross-sectional view of a configuration of a zoom lens according to Example 2 of the present invention and a movement locus thereof.
Figure 10:
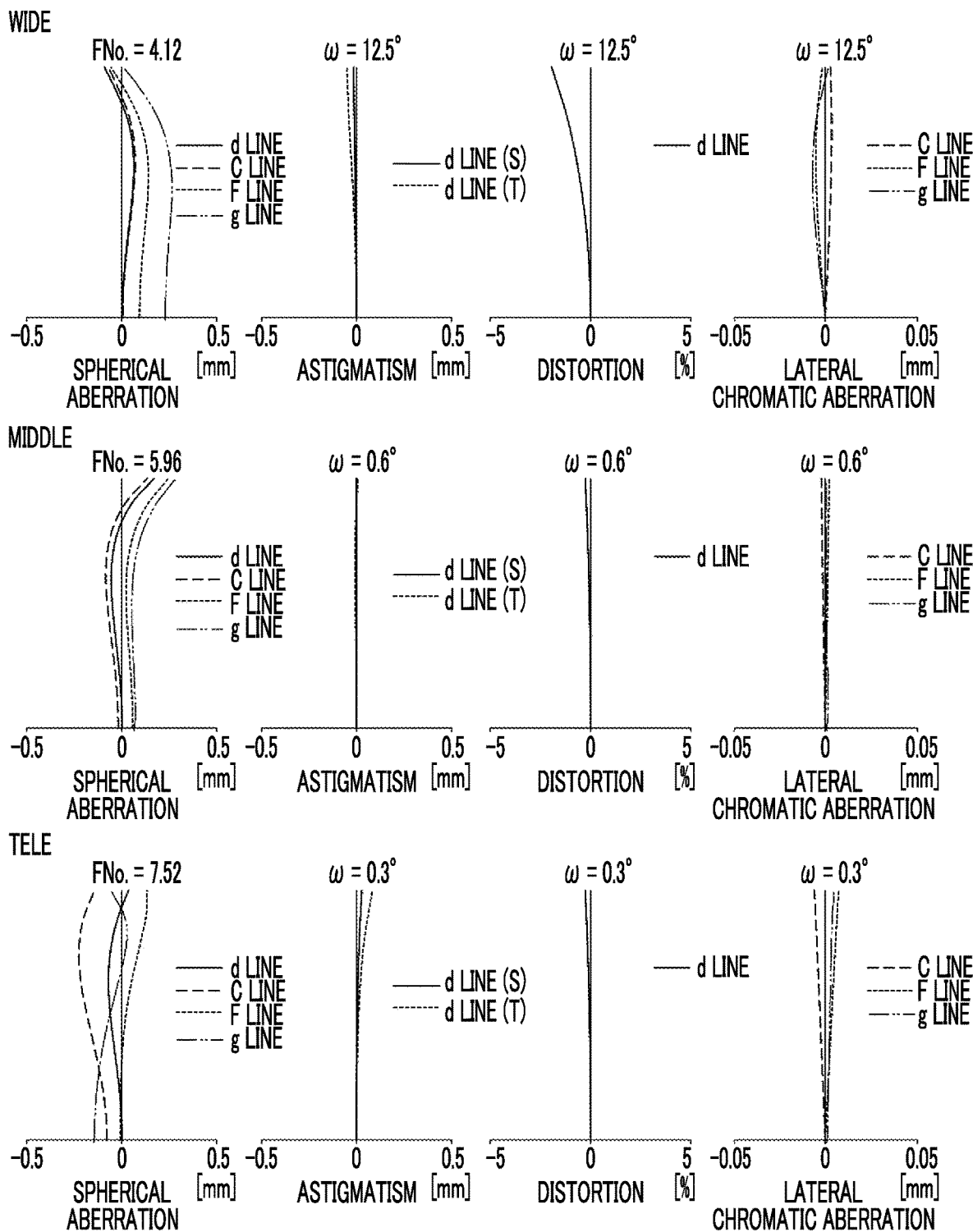
FIG. 10 shows spherical aberration diagrams, astigmatism diagrams, distortion diagrams, lateral chromatic aberration diagrams of the zoom lens of Example 2 of the present invention.

FIG. 4 shows a configuration and movement loci of the zoom lens of Example 2. The zoom lens of Example 2 has the same configuration as the outline of the zoom lens of Example 1. Regarding the zoom lens of Example 2, Tables 3A and 3B show basic lens data thereof, Table 4 shows specification and variable surface distances thereof, and FIGS. 10 and 11 show aberration diagrams thereof. FIG. 10 shows aberration diagrams in a state where there is no image blurring. In FIG. 11, the upper part labeled by "no optical system tilt" shows aberrations in the state where there is no image blurring. The lower part labeled by "optical system tilt 0.2° correction" shows aberrations in a state where image blur correction is performed by moving the vibration reduction lens group by 1.2 mm in a direction perpendicular to the optical axis Z in a case where there is image blurring caused by the optical system tilt of 0.2°.

TABLE 3A

Example 2

| Sn | R | D | Nd | vd | θgF |
|---|---|---|---|---|---|
| 1 | 189.63948 | 4.020 | 1.54072 | 47.23 | 0.56511 |
| 2 | 109.16441 | 20.000 | 1.49700 | 81.61 | 0.53887 |
| 3 | −323.57508 | 0.100 | | | |
| 4 | 125.86904 | 15.980 | 1.49700 | 81.61 | 0.53887 |
| 5 | −326.49142 | 4.000 | 1.72916 | 54.68 | 0.54451 |
| 6 | 215.57380 | DD[6] | | | |
| 7 | 100.16940 | 4.269 | 1.90366 | 31.31 | 0.59481 |
| 8 | −42.83623 | 3.112 | 1.76182 | 26.52 | 0.61361 |
| 9 | 34.29345 | 4.225 | | | |
| 10 | −31.73082 | 1.353 | 1.77250 | 49.60 | 0.55212 |
| 11 | 298.80785 | 0.167 | | | |
| 12 | 249.36150 | 4.586 | 1.84666 | 23.78 | 0.62054 |
| 13 | −27.40936 | 1.010 | 1.69680 | 55.53 | 0.54341 |
| 14 | 142.90540 | DD[14] | | | |
| 15 | 124.51969 | 2.000 | 1.49700 | 81.61 | 0.53887 |
| 16 | −95.91997 | 0.100 | | | |
| 17 | 42.70159 | 3.400 | 1.49700 | 81.61 | 0.53887 |
| 18 | 573.69311 | 2.015 | | | |
| 19 | 40.37521 | 2.742 | 1.91082 | 35.25 | 0.58224 |
| 20 | 22.11417 | 4.254 | 1.49700 | 81.61 | 0.53887 |
| 21 | 130.44041 | DD[21] | | | |
| 22(St) | ∞ | 2.000 | | | |

TABLE 3B

Example 2

| Sn | R | D | Nd | vd | θgF | |
|---|---|---|---|---|---|---|
| 23 | 56.59317 | 2.287 | 1.84666 | 23.78 | 0.62054 | G4A |
| 24 | −106.90562 | 1.412 | | | | |
| 25 | −28.64033 | 1.236 | 1.90366 | 31.31 | 0.59481 | |
| 26 | 40.75154 | 1.419 | | | | |
| 27 | 104.65910 | 3.984 | 1.49700 | 81.61 | 0.53887 | |
| 28 | −18.44494 | 2.500 | | | | |
| 29 | −16.33779 | 1.030 | 1.49700 | 81.61 | 0.53887 | G4B |
| 30 | 83.64403 | 1.012 | | | | |
| 31 | −77.97405 | 3.144 | 1.69895 | 30.13 | 0.60298 | |
| 32 | −17.04606 | 0.100 | | | | |
| 33 | −10338.57625 | 1.000 | 1.48749 | 70.24 | 0.53007 | |
| 34 | 62.39820 | 0.826 | | | | |
| 35 | −180.74025 | 1.000 | 1.90366 | 31.31 | 0.59481 | |
| 36 | 39.29528 | 2.506 | | | | |
| 37 | 35.13660 | 1.652 | 1.80518 | 25.42 | 0.61616 | G4C |
| 38 | 80.01987 | 2.071 | 1.72047 | 34.71 | 0.58350 | |
| 39 | −57.37712 | 0.100 | | | | |
| 40 | 27.22744 | 3.684 | 1.59551 | 39.24 | 0.58043 | |
| 41 | −25.61711 | 0.001 | | | | |
| 42 | −27.86160 | 1.000 | 1.92286 | 20.88 | 0.63900 | |
| 43 | 102.53063 | 5.560 | | | | |
| 44 | 764.66741 | 1.010 | 1.80450 | 39.64 | 0.57146 | G4D |
| 45 | 8.34479 | 3.151 | 1.80518 | 25.42 | 0.61616 | |
| 46 | 19.01225 | 5.750 | | | | |
| 47 | −75.86665 | 1.000 | 1.80610 | 33.27 | 0.58845 | |
| 48 | 27.28969 | 2.086 | | | | |
| 49 | 33.40735 | 4.379 | 1.49700 | 81.61 | 0.53887 | |
| 50 | −20.41437 | 21.511 | | | | |
| 51 | 19.87760 | 1.974 | 1.92286 | 18.90 | 0.64960 | G4E |

TABLE 3B-continued

Example 2

| Sn | R | D | Nd | vd | θgF |
|---|---|---|---|---|---|
| 52 | 25.84424 | 3.076 | | | |
| 53 | −87.26561 | 4.896 | 1.49700 | 81.61 | 0.53887 |
| 54 | −14.15654 | 1.184 | 1.80518 | 25.42 | 0.61616 |
| 55 | −21.08275 | 1.624 | | | |
| 56 | ∞ | 1.000 | 1.51680 | 64.20 | 0.53430 |
| 57 | ∞ | 9.908 | | | |

TABLE 4

Example 2

| | WIDE | MIDDLE | TELE |
|---|---|---|---|
| Zr | 1.0 | 19.8 | 38.4 |
| f | 20.506 | 405.615 | 787.443 |
| Bf | 12.191 | 12.191 | 12.191 |
| FNo. | 4.12 | 5.96 | 7.52 |
| 2ω(°) | 25.0 | 1.2 | 0.6 |
| DD[6] | 3.149 | 133.389 | 143.248 |
| DD[14] | 193.302 | 29.174 | 3.451 |
| DD[21] | 3.091 | 36.980 | 52.844 |

Example 3

Figure 5:
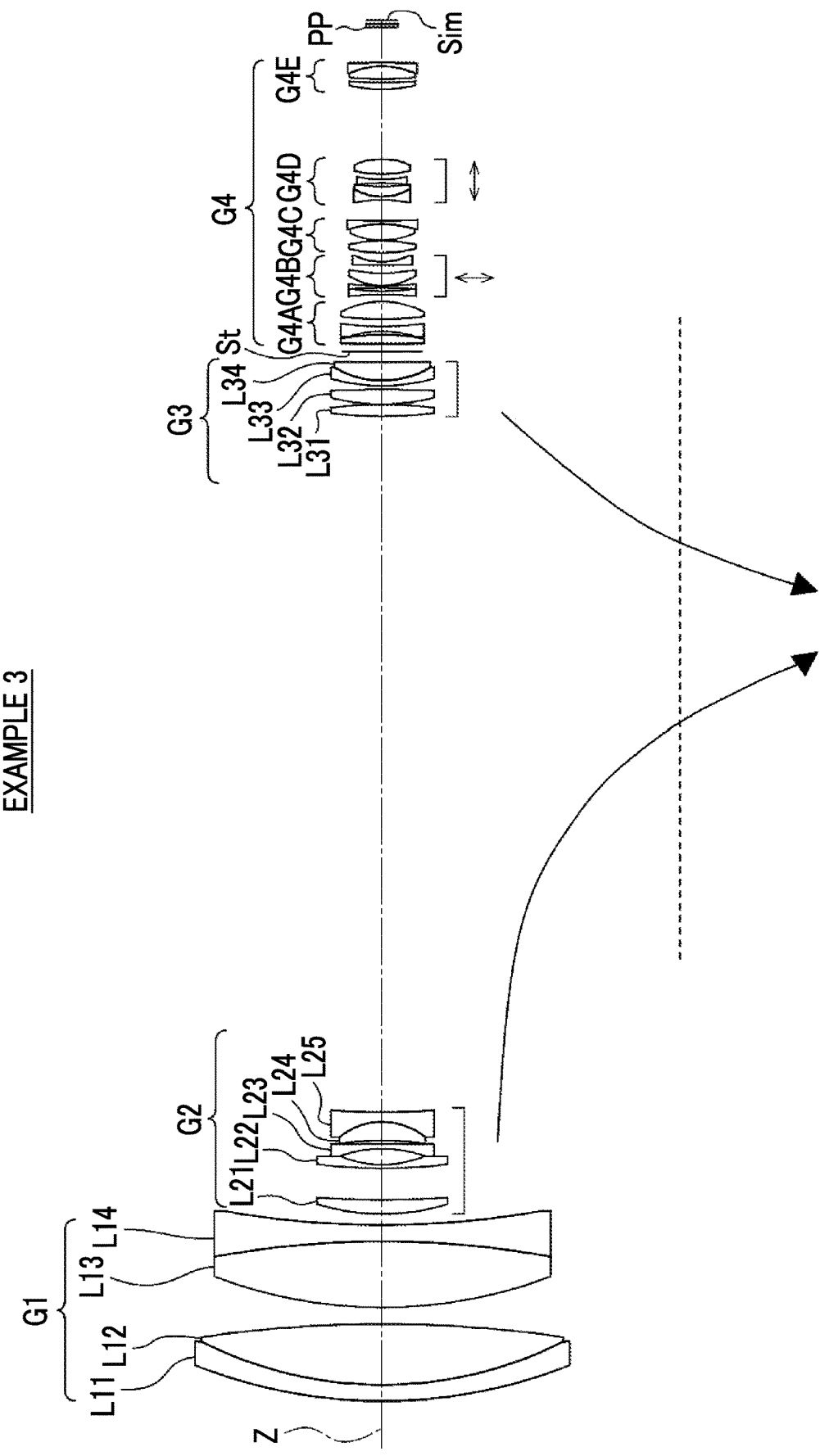
FIG. 5 is a diagram showing a cross-sectional view of a configuration of a zoom lens according to Example 3 of the present invention and a movement locus thereof.
Figure 12:
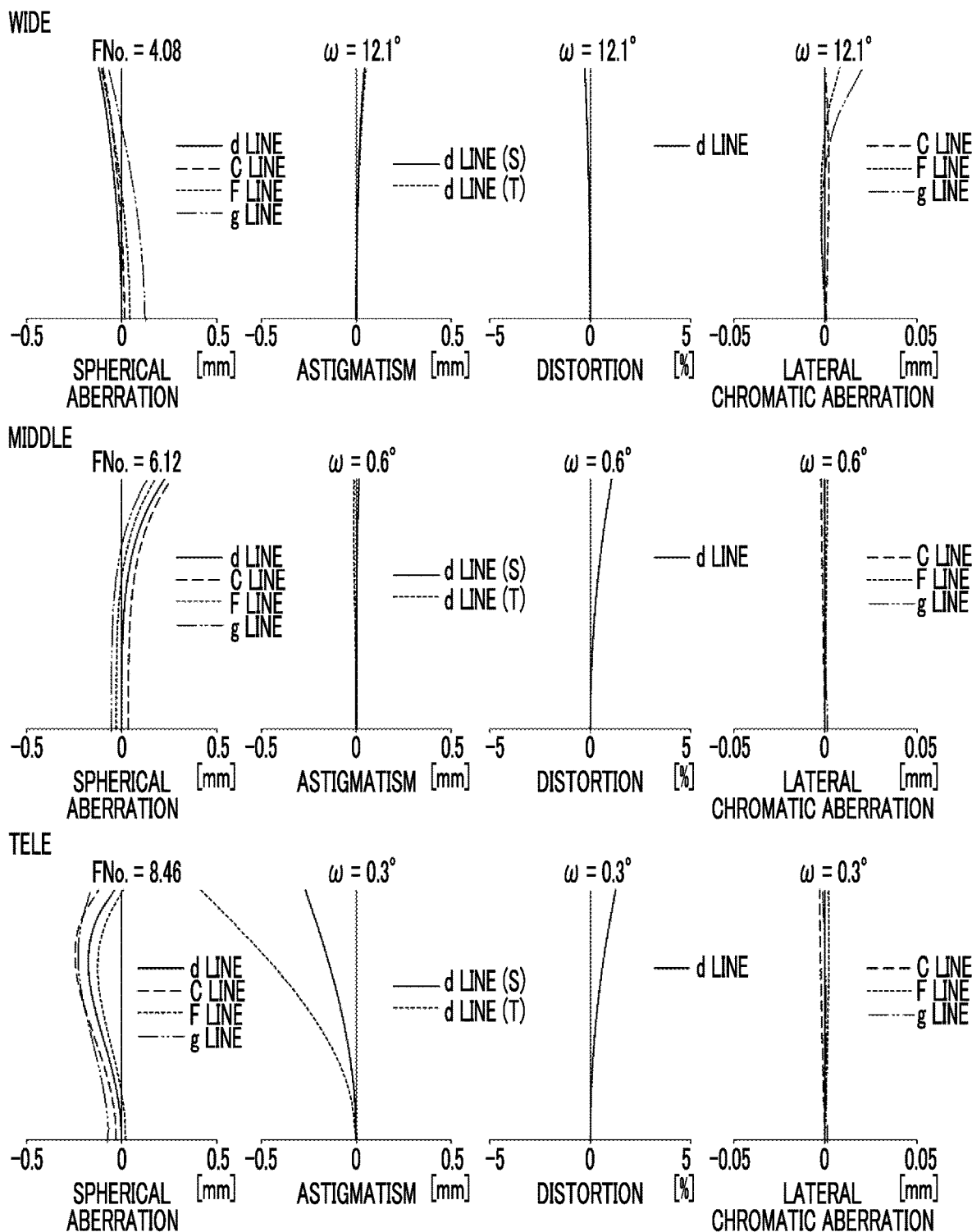
FIG. 12 shows spherical aberration diagrams, astigmatism diagrams, distortion diagrams, lateral chromatic aberration diagrams of the zoom lens of Example 3 of the present invention.

FIG. 5 shows a configuration and movement loci of the zoom lens of Example 3. The zoom lens of Example 3 has the same configuration as the outline of the zoom lens of Example 1. Regarding the zoom lens of Example 3, Tables 5A and 5B show basic lens data thereof, Table 6 shows specification and variable surface distances thereof, and FIGS. 12 and 13 show aberration diagrams thereof. FIG. 12 shows aberration diagrams in a state where there is no image blurring. In FIG. 13, the upper part labeled by "no optical system tilt" shows aberrations in the state where there is no image blurring. The lower part labeled by "optical system tilt 0.2° correction" shows aberrations in a state where image blur correction is performed by moving the vibration reduction lens group by 1.2 mm in a direction perpendicular to the optical axis Z in a case where there is image blurring caused by the optical system tilt of 0.2°.

TABLE 5A

Example 3

| Sn | R | D | Nd | vd | θgF |
|---|---|---|---|---|---|
| 1 | 153.14642 | 4.620 | 1.48749 | 70.24 | 0.53007 |
| 2 | 119.90697 | 17.426 | 1.43875 | 94.94 | 0.53433 |
| 3 | −379.00477 | 4.787 | | | |
| 4 | 141.77259 | 18.960 | 1.43875 | 94.94 | 0.53433 |
| 5 | −273.90488 | 4.693 | 1.72000 | 50.23 | 0.55214 |
| 6 | 273.90488 | DD[6] | | | |
| 7 | 65.27759 | 4.078 | 1.80440 | 39.58 | 0.57623 |
| 8 | 285.11784 | 8.892 | | | |
| 9 | 163.37208 | 1.000 | 1.80100 | 34.97 | 0.58642 |
| 10 | 31.62047 | 4.598 | | | |
| 11 | −35.30917 | 1.350 | 1.60300 | 65.44 | 0.54022 |
| 12 | −2518.69717 | 1.011 | | | |
| 13 | −88.03746 | 5.310 | 1.80000 | 29.84 | 0.60178 |
| 14 | −19.99000 | 2.847 | 1.71300 | 53.87 | 0.54587 |
| 15 | 204.67501 | DD[15] | | | |
| 16 | 123.62862 | 3.364 | 1.49700 | 81.61 | 0.53887 |
| 17 | −123.62862 | 0.100 | | | |
| 18 | 60.47216 | 4.216 | 1.49700 | 81.61 | 0.53887 |
| 19 | −384.06710 | 1.041 | | | |
| 20 | 54.73233 | 1.528 | 1.91082 | 35.25 | 0.58224 |

TABLE 5A-continued

Example 3

| Sn | R | D | Nd | vd | θgF |
|---|---|---|---|---|---|
| 21 | 27.77296 | 5.251 | 1.53775 | 74.70 | 0.53936 |
| 22 | 3603283.43849 | DD[22] | | | |
| 23(St) | ∞ | 2.245 | | | |

TABLE 5B

Example 3

| Sn | R | D | Nd | vd | θgF | |
|---|---|---|---|---|---|---|
| 24 | 602.51577 | 2.673 | 1.73800 | 32.33 | 0.59005 | G4A |
| 25 | −59.08468 | 0.948 | | | | |
| 26 | −30.21297 | 1.390 | 1.83481 | 42.72 | 0.56486 | |
| 27 | 98.34118 | 2.107 | | | | |
| 28 | 103.99476 | 5.012 | 1.51823 | 58.90 | 0.54567 | |
| 29 | −25.35380 | 2.000 | | | | |
| 30 | −111.53786 | 0.980 | 1.71700 | 47.93 | 0.56062 | G4B |
| 31 | 58.82104 | 0.980 | | | | |
| 32 | −121.78147 | 0.600 | 1.72000 | 46.02 | 0.56358 | |
| 33 | 91.83917 | 0.100 | | | | |
| 34 | 18.60403 | 3.485 | 1.80000 | 29.84 | 0.60178 | |
| 35 | 42.53239 | 2.373 | | | | |
| 36 | 1000.95384 | 0.900 | 1.61340 | 44.27 | 0.56340 | |
| 37 | 18.27933 | 2.570 | | | | |
| 38 | 43.84423 | 3.344 | 1.65412 | 39.68 | 0.57378 | G4C |
| 39 | −43.84423 | 0.100 | | | | |
| 40 | 22.14998 | 4.671 | 1.51742 | 52.43 | 0.55649 | |
| 41 | −31.40728 | 1.000 | 1.85478 | 24.80 | 0.61232 | |
| 42 | 293.64878 | 5.879 | | | | |
| 43 | −43.28059 | 0.950 | 1.77250 | 49.60 | 0.55212 | G4D |
| 44 | 15.82058 | 2.917 | 1.63980 | 34.47 | 0.59233 | |
| 45 | 43.43988 | 1.033 | | | | |
| 46 | −54.17857 | 1.057 | 1.71300 | 53.87 | 0.54587 | |
| 47 | 39.49767 | 1.540 | | | | |
| 48 | 38.92857 | 4.292 | 1.51742 | 52.43 | 0.55649 | |
| 49 | −19.20102 | 19.990 | | | | |
| 50 | 41.12190 | 2.011 | 1.80518 | 25.42 | 0.61616 | G4E |
| 51 | 152.15703 | 0.975 | | | | |
| 52 | 129.06454 | 3.635 | 1.53775 | 74.70 | 0.53936 | |
| 53 | −22.73211 | 1.000 | 1.83400 | 37.21 | 0.58082 | |
| 54 | −396.54954 | 10.220 | | | | |
| 55 | ∞ | 1.000 | 1.51680 | 64.20 | 0.53430 | |
| 56 | ∞ | 0.903 | | | | |

TABLE 6

Example 3

| | WIDE | MIDDLE | TELE |
|---|---|---|---|
| Zr | 1.0 | 19.8 | 38.4 |
| f | 20.858 | 412.580 | 800.963 |
| Bf | 11.782 | 11.782 | 11.782 |
| FNo. | 4.08 | 6.12 | 8.46 |
| 2ω(°) | 24.2 | 1.2 | 0.6 |
| DD[6] | 3.147 | 136.416 | 146.435 |
| DD[15] | 198.937 | 30.782 | 4.557 |
| DD[22] | 3.008 | 37.893 | 54.100 |

Example 4

Figure 6:
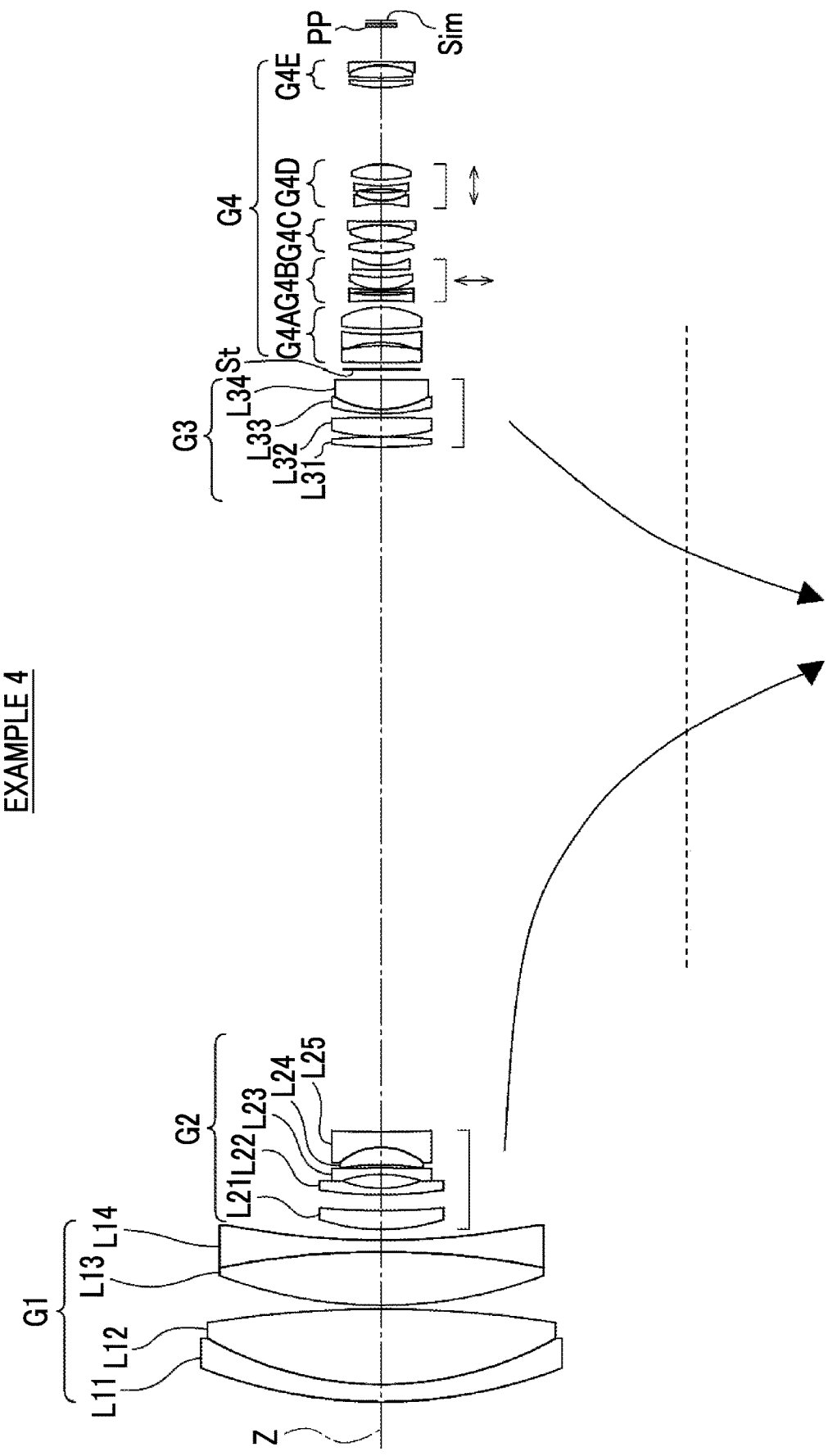
FIG. 6 is a diagram showing a cross-sectional view of a configuration of a zoom lens according to Example 4 of the present invention and a movement locus thereof.
Figure 14:
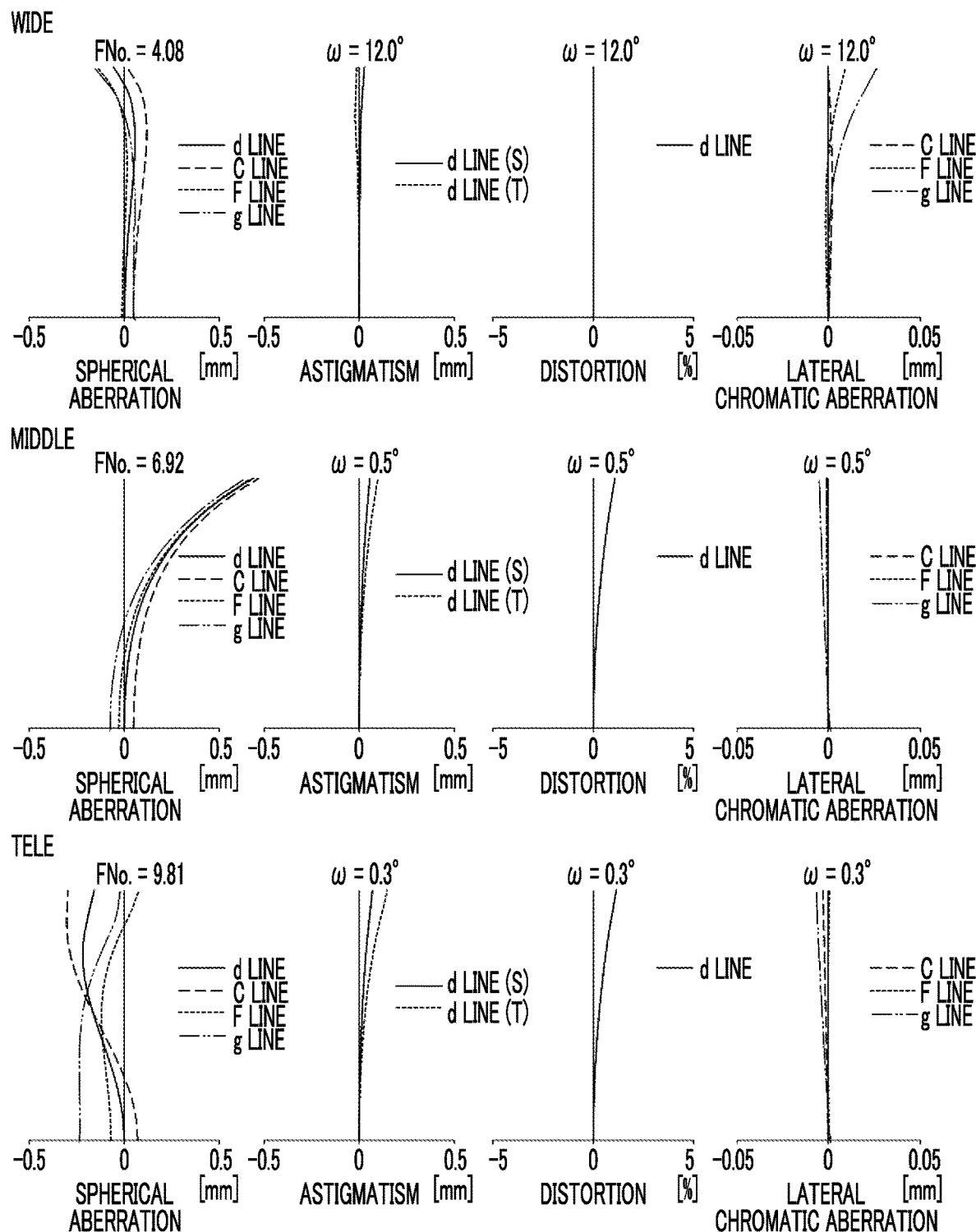
FIG. 14 shows spherical aberration diagrams, astigmatism diagrams, distortion diagrams, lateral chromatic aberration diagrams of the zoom lens of Example 4 of the present invention.

FIG. 6 shows a configuration and movement loci of the zoom lens of Example 4. The zoom lens of Example 4 has the same configuration as the outline of the zoom lens of Example 1. Regarding the zoom lens of Example 4, Tables 7A and 7B show basic lens data thereof, Table 8 shows specification and variable surface distances thereof, and FIGS. 14 and 15 show aberration diagrams thereof. FIG. 14 shows aberration diagrams in a state where there is no image blurring. In FIG. 15, the upper part labeled by "no optical system tilt" shows aberrations in the state where there is no image blurring. The lower part labeled by "optical system tilt 0.2° correction" shows aberrations in a state where image blur correction is performed by moving the vibration reduction lens group by 1.2 mm in a direction perpendicular to the optical axis Z in a case where there is image blurring caused by the optical system tilt of 0.2°.

TABLE 7A

Example 4

| Sn | R | D | Nd | vd | θgF |
|---|---|---|---|---|---|
| 1 | 156.18317 | 5.142 | 1.56883 | 56.36 | 0.54890 |
| 2 | 109.71762 | 22.447 | 1.49700 | 81.61 | 0.53887 |
| 3 | −348.50988 | 1.099 | | | |
| 4 | 141.75177 | 15.929 | 1.49700 | 81.61 | 0.53887 |
| 5 | −260.97976 | 3.500 | 1.77231 | 47.26 | 0.55743 |
| 6 | 249.38348 | DD[6] | | | |
| 7 | 62.27432 | 5.626 | 1.80440 | 39.58 | 0.57623 |
| 8 | 219.65214 | 4.696 | | | |
| 9 | 124.64918 | 1.902 | 1.91082 | 35.25 | 0.58224 |
| 10 | 32.78579 | 4.144 | | | |
| 11 | −39.23641 | 1.770 | 1.72916 | 54.68 | 0.54451 |
| 12 | −621.55780 | 0.981 | | | |
| 13 | −74.95867 | 5.220 | 1.79973 | 27.23 | 0.61035 |
| 14 | −19.22124 | 4.583 | 1.71300 | 53.87 | 0.54587 |
| 15 | 319.92408 | DD[15] | | | |
| 16 | 122.02579 | 3.057 | 1.49700 | 81.61 | 0.53887 |
| 17 | −154.14098 | 0.100 | | | |
| 18 | 64.33922 | 5.659 | 1.49700 | 81.61 | 0.53887 |
| 19 | −544.93838 | 1.112 | | | |
| 20 | 58.51170 | 1.350 | 1.91082 | 35.25 | 0.58224 |
| 21 | 28.83566 | 8.746 | 1.53775 | 74.70 | 0.53936 |
| 22 | −2000.43146 | DD[22] | | | |
| 23(St) | ∞ | 2.000 | | | |

TABLE 7B

Example 4

| Sn | R | D | Nd | vd | θgF | |
|---|---|---|---|---|---|---|
| 24 | 388.94584 | 4.978 | 1.72342 | 37.95 | 0.58370 | G4A |
| 25 | −58.53854 | 0.975 | | | | |
| 26 | −30.38850 | 2.437 | 1.80440 | 39.58 | 0.57623 | |
| 27 | 86.84352 | 1.647 | | | | |
| 28 | 98.18704 | 6.467 | 1.51742 | 52.43 | 0.55649 | |
| 29 | −25.28694 | 2.000 | | | | |
| 30 | −120.65758 | 1.561 | 1.71300 | 53.87 | 0.54587 | G4B |
| 31 | 59.11034 | 0.973 | | | | |
| 32 | −128.62294 | 0.600 | 1.71300 | 53.87 | 0.54587 | |
| 33 | 94.42399 | 0.160 | | | | |
| 34 | 18.73693 | 3.624 | 1.80000 | 29.84 | 0.60178 | |
| 35 | 41.87423 | 2.272 | | | | |
| 36 | 263.92579 | 1.255 | 1.64850 | 53.02 | 0.55487 | |
| 37 | 18.05940 | 3.743 | | | | |
| 38 | 43.96796 | 3.337 | 1.65412 | 39.68 | 0.57378 | G4C |
| 39 | −43.98322 | 0.100 | | | | |
| 40 | 22.01729 | 4.722 | 1.51742 | 52.43 | 0.55649 | |
| 41 | −30.37330 | 1.000 | 1.85478 | 24.80 | 0.61232 | |
| 42 | 271.87625 | 5.243 | | | | |
| 43 | −41.64059 | 0.950 | 1.77250 | 49.60 | 0.55212 | G4D |
| 44 | 17.03034 | 2.447 | 1.63980 | 34.47 | 0.59233 | |
| 45 | 44.02818 | 1.018 | | | | |
| 46 | −52.57979 | 0.988 | 1.71300 | 53.87 | 0.54587 | |
| 47 | 40.14766 | 1.815 | | | | |
| 48 | 37.30676 | 4.618 | 1.51742 | 52.43 | 0.55649 | |
| 49 | −19.50296 | 22.874 | | | | |
| 50 | 42.60670 | 1.958 | 1.80518 | 25.42 | 0.61616 | G4E |
| 51 | 146.55832 | 0.950 | | | | |
| 52 | 106.16150 | 3.731 | 1.51742 | 52.43 | 0.55649 | |
| 53 | −22.51247 | 1.027 | 1.85478 | 24.80 | 0.61232 | |

TABLE 7B-continued

Example 4

| Sn | R | D | Nd | vd | θgF |
|---|---|---|---|---|---|
| 54 | −337.93548 | 10.364 | | | |
| 55 | ∞ | 1.000 | 1.51680 | 64.20 | 0.53430 |
| 56 | ∞ | 0.895 | | | |

TABLE 8

Example 4

| | WIDE | MIDDLE | TELE |
|---|---|---|---|
| Zr | 1.0 | 22.5 | 45.0 |
| f | 20.851 | 469.574 | 938.315 |
| Bf | 11.918 | 11.918 | 11.918 |
| FNo. | 4.08 | 6.92 | 9.81 |
| 2ω(°) | 24.0 | 1.0 | 0.6 |
| DD[6] | 3.203 | 131.172 | 139.942 |
| DD[15] | 203.336 | 32.164 | 3.305 |
| DD[22] | 2.931 | 46.134 | 66.224 |

Example 5

Figure 7:
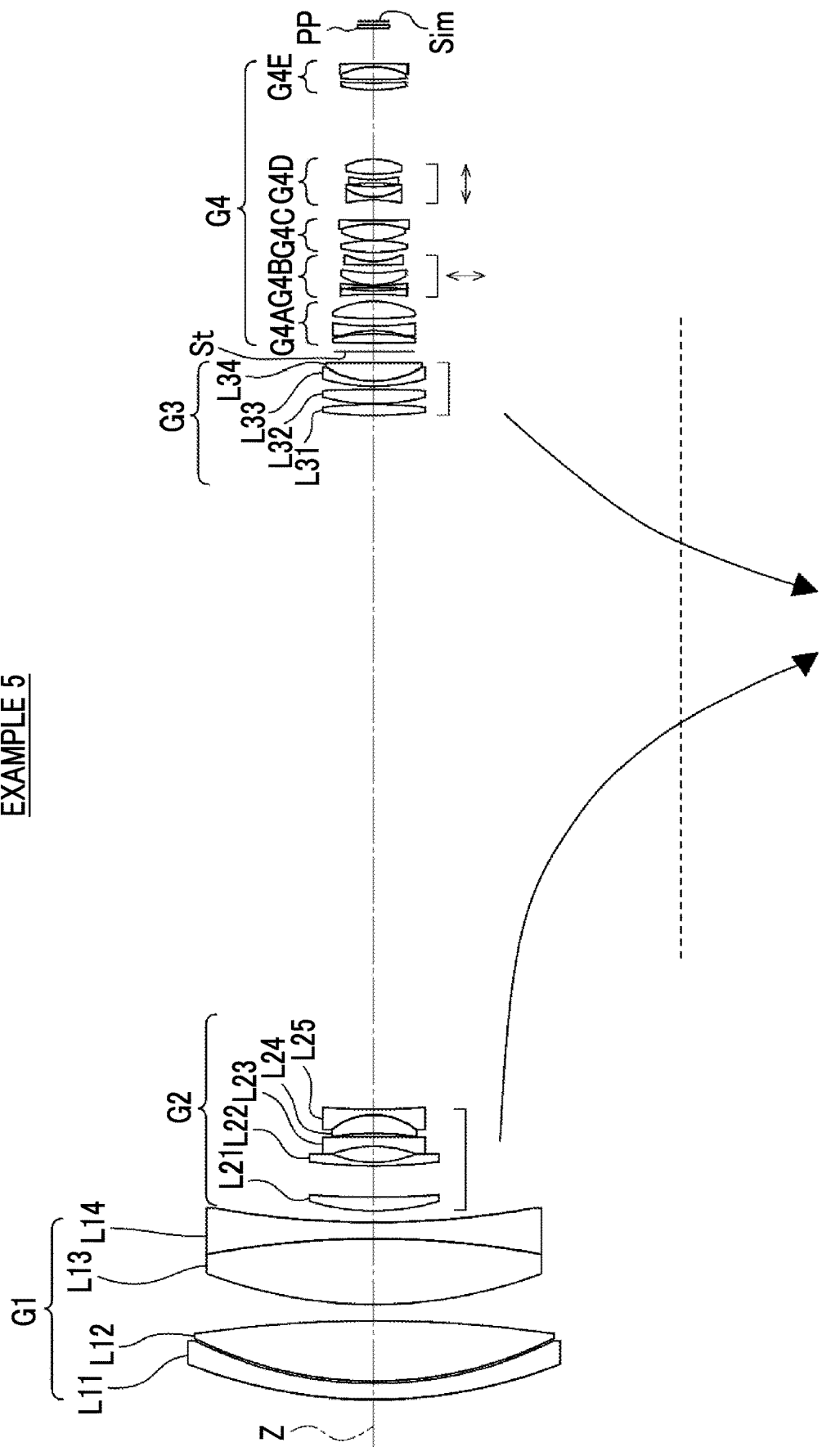
FIG. 7 is a diagram showing a cross-sectional view of a configuration of a zoom lens according to Example 5 of the present invention and a movement locus thereof.
Figure 16:
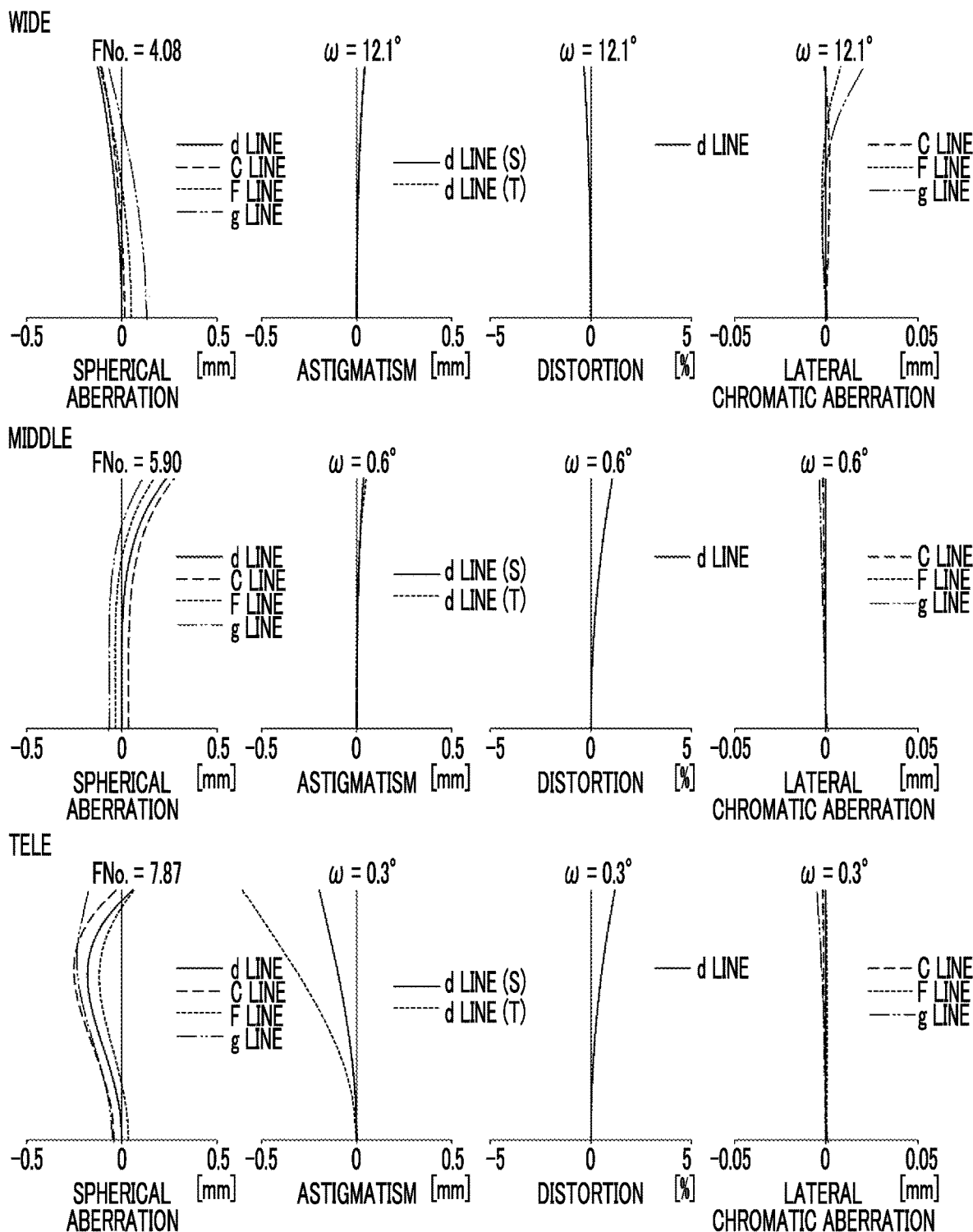
FIG. 16 shows spherical aberration diagrams, astigmatism diagrams, distortion diagrams, lateral chromatic aberration diagrams of the zoom lens of Example 5 of the present invention.

FIG. 7 shows a configuration and movement loci of the zoom lens of Example 5. The zoom lens of Example 5 has the same configuration as the outline of the zoom lens of Example 1. Regarding the zoom lens of Example 5, Tables 9A and 9B show basic lens data thereof, Table 10 shows specification and variable surface distances thereof, and FIGS. 16 and 17 show aberration diagrams thereof. FIG. 16 shows aberration diagrams in a state where there is no image blurring. In FIG. 17, the upper part labeled by "no optical system tilt" shows aberrations in the state where there is no image blurring. The lower part labeled by "optical system tilt 0.2° correction" shows aberrations in a state where image blur correction is performed by moving the vibration reduction lens group by 1.2 mm in a direction perpendicular to the optical axis Z in a case where there is image blurring caused by the optical system tilt of 0.2°.

TABLE 9A

Example 5

| Sn | R | D | Nd | vd | θgF |
|---|---|---|---|---|---|
| 1 | 153.19131 | 4.600 | 1.48749 | 70.24 | 0.53007 |
| 2 | 119.88632 | 0.675 | | | |
| 3 | 119.93016 | 17.420 | 1.43875 | 94.94 | 0.53433 |
| 4 | −379.37194 | 4.737 | | | |
| 5 | 141.69387 | 18.905 | 1.43875 | 94.94 | 0.53433 |
| 6 | −273.69704 | 4.779 | 1.72000 | 50.23 | 0.55214 |
| 7 | 273.69704 | DD[7] | | | |
| 8 | 65.33934 | 3.978 | 1.80440 | 39.58 | 0.57623 |
| 9 | 287.88459 | 8.879 | | | |
| 10 | 158.30087 | 1.000 | 1.80100 | 34.97 | 0.58642 |
| 11 | 31.61610 | 4.596 | | | |
| 12 | −35.31482 | 2.741 | 1.60300 | 65.44 | 0.54022 |
| 13 | −2518.69717 | 1.002 | | | |
| 14 | −84.83867 | 5.364 | 1.80000 | 29.84 | 0.60178 |
| 15 | −19.97770 | 1.614 | 1.71300 | 53.87 | 0.54587 |
| 16 | 219.92655 | DD[16] | | | |
| 17 | 124.05346 | 3.220 | 1.49700 | 81.61 | 0.53887 |
| 18 | −124.05346 | 0.162 | | | |
| 19 | 60.44871 | 4.071 | 1.49700 | 81.61 | 0.53887 |
| 20 | −388.71718 | 0.998 | | | |
| 21 | 54.79019 | 1.507 | 1.91082 | 35.25 | 0.58224 |

TABLE 9A-continued

Example 5

| Sn | R | D | Nd | vd | θgF |
|---|---|---|---|---|---|
| 22 | 27.77310 | 4.996 | 1.53775 | 74.70 | 0.53936 |
| 23 | 3603283.43849 | DD[23] | | | |
| 24(St) | ∞ | 2.474 | | | |

TABLE 9B

Example 5

| Sn | R | D | Nd | vd | θgF | |
|---|---|---|---|---|---|---|
| 25 | 603.15211 | 2.600 | 1.73800 | 32.33 | 0.59005 | G4A |
| 26 | −59.08978 | 0.940 | | | | |
| 27 | −30.21174 | 1.374 | 1.83481 | 42.72 | 0.56486 | |
| 28 | 98.32901 | 2.102 | | | | |
| 29 | 104.01203 | 5.013 | 1.51823 | 58.90 | 0.54567 | |
| 30 | −25.35503 | 2.000 | | | | |
| 31 | −111.52618 | 0.980 | 1.71700 | 47.93 | 0.56062 | G4B |
| 32 | 58.81803 | 0.979 | | | | |
| 33 | −121.76401 | 0.600 | 1.72000 | 46.02 | 0.56358 | |
| 34 | 91.83343 | 0.100 | | | | |
| 35 | 18.60375 | 3.494 | 1.80000 | 29.84 | 0.60178 | |
| 36 | 42.53157 | 2.380 | | | | |
| 37 | 1000.95384 | 0.908 | 1.61340 | 44.27 | 0.56340 | |
| 38 | 18.27993 | 2.569 | | | | |
| 39 | 43.84495 | 3.346 | 1.65412 | 39.68 | 0.57378 | G4C |
| 40 | −43.84495 | 0.100 | | | | |
| 41 | 22.15022 | 4.670 | 1.51742 | 52.43 | 0.55649 | |
| 42 | −31.40539 | 1.000 | 1.85478 | 24.80 | 0.61232 | |
| 43 | 293.59443 | 5.881 | | | | |
| 44 | −43.27943 | 0.950 | 1.77250 | 49.60 | 0.55212 | G4D |
| 45 | 15.82251 | 2.921 | 1.63980 | 34.47 | 0.59233 | |
| 46 | 43.43920 | 1.034 | | | | |
| 47 | −54.17723 | 1.062 | 1.71300 | 53.87 | 0.54587 | |
| 48 | 39.49822 | 1.540 | | | | |
| 49 | 38.92754 | 4.290 | 1.51742 | 52.43 | 0.55649 | |
| 50 | −19.20136 | 19.987 | | | | |
| 51 | 41.12104 | 2.013 | 1.80518 | 25.42 | 0.61616 | G4E |
| 52 | 152.14239 | 0.980 | | | | |
| 53 | 129.01522 | 3.638 | 1.53775 | 74.70 | 0.53936 | |
| 54 | −22.72792 | 1.000 | 1.83400 | 37.21 | 0.58082 | |
| 55 | −396.71793 | 10.217 | | | | |
| 56 | ∞ | 1.000 | 1.51680 | 64.20 | 0.53430 | |
| 57 | ∞ | 0.896 | | | | |

TABLE 10

Example 5

| | WIDE | MIDDLE | TELE |
|---|---|---|---|
| Zr | 1.0 | 19.8 | 38.4 |
| f | 20.859 | 412.583 | 800.97C |
| Bf | 11.773 | 11.773 | 11.773 |
| FNo. | 4.08 | 5.90 | 7.87 |
| 2ω(°) | 24.2 | 1.2 | 0.6 |
| DD[7] | 3.296 | 136.712 | 146.736 |
| DD[16] | 199.439 | 31.078 | 4.83C |
| DD[23] | 3.280 | 38.225 | 54.449 |

Table 11 shows values corresponding to Conditional Expressions (1) to (6) of the zoom lenses of Examples 1 to 5. Among the values shown in Table 11, values other than the corresponding values of Conditional Expression (3) are based on the d line. The bottom column of Table 11 shows the value of TL/ft in a case where the total optical length is TL and the focal length of the whole system at the telephoto end is ft. TL/ft is the telephoto ratio. All the telephoto ratios of Examples 1 to 5 are equal to or less than 0.5.

TABLE 11

| | Example 1 | Example 2 | Example 3 | Example 4 | Example 5 |
|---|---|---|---|---|---|
| (1) f4abc/f4d | −1.468 | −2.364 | −2.003 | −1.565 | −2.005 |
| (2) G1Pr/G1D | −0.720 | −0.756 | −0.891 | −0.789 | −0.876 |
| (3) θgF11 − θgF12 | −0.00457 | 0.02624 | −0.00425 | 0.01002 | −0.00425 |
| (4) G12DT/f1 | 0.569 | 0.599 | 0.546 | 0.576 | 0.547 |
| (5) 1/βG4B | −0.286 | −0.190 | −0.231 | −0.217 | −0.231 |
| (6) βG4D | 2.312 | 3.210 | 2.322 | 2.348 | 2.322 |
| TL/ft | 0.479 | 0.481 | 0.493 | 0.437 | 0.494 |

For comparison, Table 12 shows the telephoto ratios of Examples 1 to 4 of JP5857306B described above, as Comparative Examples 1 to 4, respectively. All the telephoto ratios of Examples 1 to 4 of JP5857306B are equal to or greater than 1.

TABLE 12

| | Comparative Example 1 | Comparative Example 2 | Comparative Example 3 | Comparative Example 4 |
|---|---|---|---|---|
| TL/ft | 1.086 | 1.082 | 1.081 | 1.081 |

As can be seen from the data described above, in the zoom lenses of Examples 1 to 5, the telephoto ratio is equal to or less than 0.5 while the focal length of the whole system at the telephoto end is equal to or greater than 780, and each zoom lens achieves the long focal length on the telephoto side and reduction in total optical length. Each zoom lens of Examples 1 to 5 is able to correct image blurring in a case where there is an optical system tilt of 0.2° at the telephoto end, and realize a large vibration reduction angle. The zoom lenses of Examples 1 to 5 each have a focusing lens group having a small diameter, and various aberrations are satisfactorily corrected, thereby realizing high optical performance.

Figure 18:
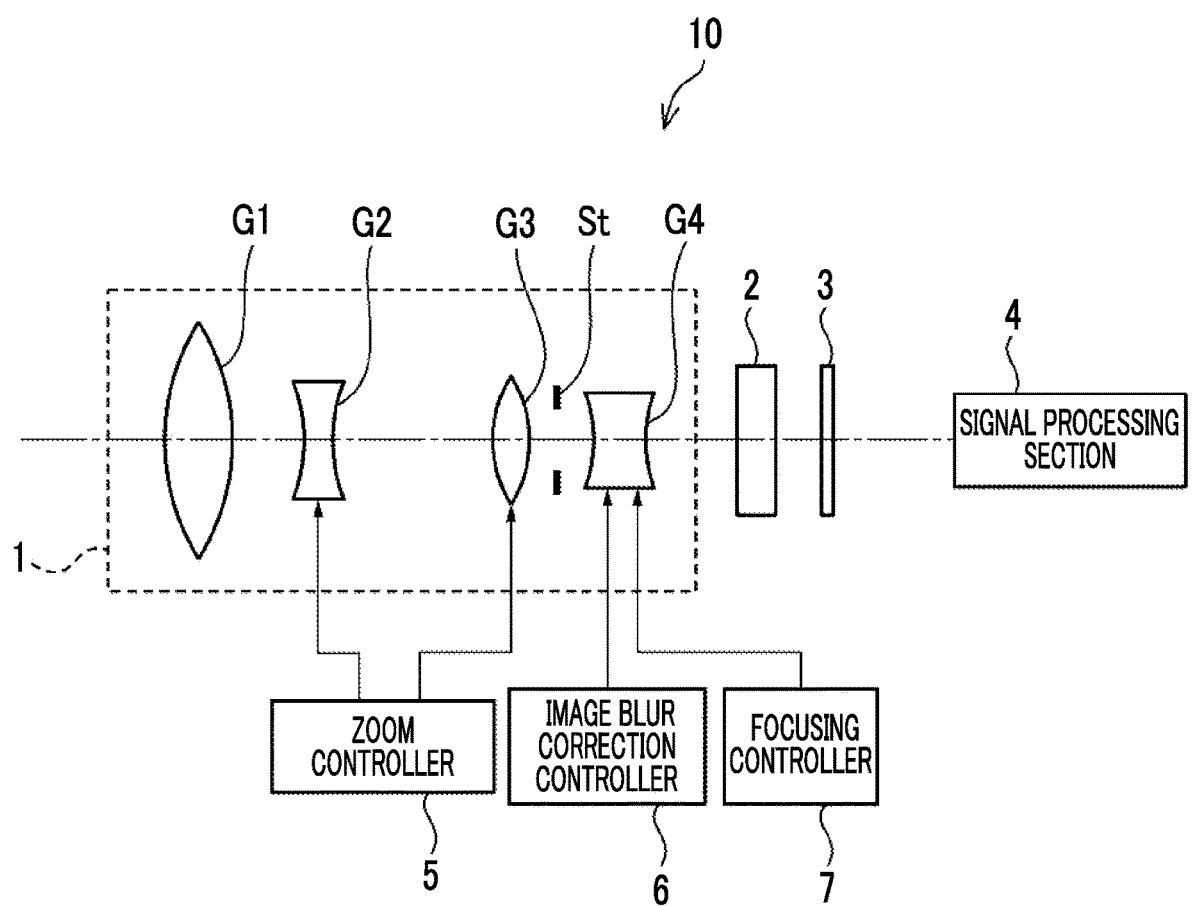
FIG. 18 is a schematic configuration diagram of an imaging apparatus according to an embodiment of the present invention.

Next, an imaging apparatus according to an embodiment of the present invention will be described. FIG. 18 is a schematic configuration diagram of an imaging apparatus 10 using the zoom lens 1 according to the above-mentioned embodiment of the present invention as an example of an imaging apparatus of an embodiment of the present invention. Examples of the imaging apparatus 10 include a surveillance camera, a video camera, and the like.

The imaging apparatus 10 comprises the zoom lens 1, a filter 2 disposed on the image side of the zoom lens 1, an imaging element 3 disposed on the image side of the filter 2, and a signal processing section 4 which performs arithmetic processing of output signals issued from the imaging element 3. FIG. 18 conceptually shows the first to fourth lens groups G1 to G4. The imaging apparatus 10 also comprises a zoom controller 5 that controls zooming, an image blur correction controller 6 that controls image blur correction, and a focusing controller 7 that controls focusing.

The imaging element 3 converts an optical image, which is formed through the zoom lens 1, into an electrical signal. For example, it is possible to use a charge coupled device (CCD), complementary metal oxide semiconductor (CMOS), or the like. The imaging element 3 is disposed such that the imaging surface thereof is coplanar with the image plane Sim of the zoom lens 1. Although only one imaging element 3 is shown in FIG. 18, a so-called three-plate imaging apparatus having three imaging elements may be used.

The technology of the present disclosure has been hitherto described through embodiments and examples, but the technology of the present disclosure is not limited to the above-mentioned embodiments and examples, and may be modified into various forms. For example, values such as the radius of curvature, the surface spacing, the refractive index, and the Abbe number of each lens component are not limited to the values shown in the numerical examples, and different values may be used therefor.

What is claimed is:

1. A zoom lens consisting of, in order from an object side to an image side:

a first lens group that has a positive refractive power;

a second lens group that has a negative refractive power;

a third lens group that has a positive refractive power;

a stop; and a fourth lens group that has a negative refractive power, wherein the fourth lens group consists of, in order from the object side to the image side, a fourth A lens group, a fourth B lens group which has a negative refractive power and which moves in a direction intersecting with an optical axis during image blur correction, a fourth C lens group which has a positive refractive power, a fourth D lens group which has a negative refractive power and which moves along the optical axis during focusing, and a fourth E lens group which has a positive refractive power, wherein during zooming from a wide-angle end to a telephoto end, the second lens group moves to the image side, the third lens group moves to the object side, and the first lens group, the stop, the fourth A lens group, the fourth B lens group, the fourth C lens group, and the fourth E lens group remain stationary with respect to an image plane, wherein during image blur correction, the fourth A lens group and the fourth C lens group remain stationary with respect to the image plane, wherein during focusing, the lens groups other than the fourth D lens group remain stationary with respect to the image plane, and wherein assuming that a composite focal length of the fourth A lens group, the fourth B lens group, and the fourth C lens group is f4abc, and a focal length of the fourth D lens group is f4d, Conditional Expression (1) is satisfied, which is represented by $$-5 < f4abc/f4d < 0 \qquad (1).$$

2. The zoom lens according to claim 1, wherein the first lens group has a cemented lens formed by cementing a biconvex lens and a biconcave lens, in order from the object side, at a position closest to the image side.

3. The zoom lens according to claim 1,
wherein a lens closest to the image side in the first lens group is a biconcave lens, and
wherein assuming that
a distance on the optical axis from a lens surface closest to the object side in the first lens group to the lens surface closest to the image side in the first lens group is G1D,
a distance on the optical axis from a reference to an image side principal point of the first lens group in a case where the lens surface closest to the image side in the first lens group is set as the reference is G1Pr, and
regarding G1Pr, a sign of the distance on the object side from the reference is negative and a sign of the distance on the image side from the reference is positive,
Conditional Expression (2) is satisfied, which is represented by $$-1.5 < G1Pr/G1D < 0 \qquad (2).$$

4. The zoom lens according to claim 3, wherein Conditional Expression (2-1) is satisfied, which is represented by $$-1 < G1Pr/G1D < -0.5 \qquad (2\text{-}1).$$

5. The zoom lens according to claim 1,
wherein the first lens group consists of, in order from the object side to the image side, a first lens as a meniscus lens of which an image side surface is concave and which has a negative refractive power, a second lens as a biconvex lens, a third lens as a biconvex lens, and a fourth lens as a biconcave lens,
wherein the third lens and the fourth lens are cemented with each other, and
wherein assuming that
a partial dispersion ratio of the first lens between a g line and an F line is θgF11, and
a partial dispersion ratio of the second lens between the g line and the F line is θgF12,
Conditional Expression (3) is satisfied, which is represented by $$-0.08 < \theta gF11 - \theta gF12 < 0.08 \qquad (3).$$

6. The zoom lens according to claim 5, wherein Conditional Expression (3-1) is satisfied, which is represented by $$-0.04 < \theta gF11 - \theta gF12 < 0.04 \qquad (3\text{-}1).$$

7. The zoom lens according to claim 1, wherein assuming that
a distance on the optical axis from a lens surface closest to the image side in the first lens group to a lens surface closest to the object side in the second lens group at the telephoto end is G12DT, and
a focal length of the first lens group is f1,
Conditional Expression (4) is satisfied, which is represented by $$0.3 < G12DT/f1 < 1 \qquad (4).$$

8. The zoom lens according to claim 7, wherein Conditional Expression (4-1) is satisfied, which is represented by $$0.45 < G12DT/f1 < 0.7 \qquad (4\text{-}1).$$

9. The zoom lens according to claim 1,
wherein the second lens group consists of, in order from the object side to the image side, a positive lens of which an object side surface is convex, a negative lens of which an image side surface is concave, a negative lens of which an object side surface is concave, and a cemented lens, and
wherein the cemented lens of the second lens group is formed by cementing a positive lens and a negative lens in order from the object side, and has a cemented surface concave toward the object side.

10. The zoom lens according to claim 1, wherein in a state where an object at infinity is in focus, during zooming from the wide-angle end to the telephoto end, the second lens group and the third lens group simultaneously pass through respective points at which lateral magnifications are −1.

11. The zoom lens according to claim 1, wherein assuming that
a lateral magnification of the fourth B lens group at the telephoto end in a state where an object at infinity is in focus is βG4B,
Conditional Expression (5) is satisfied, which is represented by $$-2 < 1/\beta G4B < 0 \qquad (5).$$

12. The zoom lens according to claim 11, wherein Conditional Expression (5-1) is satisfied, which is represented by $$-0.6 < 1/\beta G4B < -0.1 \qquad (5\text{-}1).$$

13. The zoom lens according to claim 1, wherein assuming that
a lateral magnification of the fourth D lens group at the telephoto end in a state where an object at infinity is in focus is βG4D,
Conditional Expression (6) is satisfied, which is represented by $$0.5 < \beta G4D < 6 \qquad (6).$$

14. The zoom lens according to claim 13, wherein Conditional Expression (6-1) is satisfied, which is represented by $$1.5 < \beta G4D < 4 \qquad (6\text{-}1).$$

15. The zoom lens according to claim 1, wherein the fourth D lens group consists of four lenses.

16. The zoom lens according to claim 1, wherein Conditional Expression (1-1) is satisfied, which is represented by $$-2.8 < f4abc/f4d < -1 \qquad (1\text{-}1).$$

17. An imaging apparatus comprising the zoom lens according to claim 1.

* * * * *